United States Patent
Park

(10) Patent No.: US 10,475,464 B2
(45) Date of Patent: Nov. 12, 2019

(54) METHOD AND APPARATUS FOR CONNECTING SERVICE BETWEEN USER DEVICES USING VOICE

(71) Applicant: Samsung Electronics Co., Ltd., Gyeonggi-do (KR)

(72) Inventor: Sehwan Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/797,910

(22) Filed: Oct. 30, 2017

(65) Prior Publication Data

US 2018/0047406 A1 Feb. 15, 2018

Related U.S. Application Data

(63) Continuation of application No. 13/934,839, filed on Jul. 3, 2013, now Pat. No. 9,805,733.

(30) Foreign Application Priority Data

Jul. 3, 2012 (KR) .................. 10-2012-0072290

(51) Int. Cl.
*G10L 15/22* (2006.01)
*G06F 21/32* (2013.01)
(Continued)

(52) U.S. Cl.
CPC .............. *G10L 21/00* (2013.01); *G10L 15/22* (2013.01); *H04M 1/7253* (2013.01);
(Continued)

(58) Field of Classification Search
CPC ....... G10L 15/22; G10L 15/30; G10L 17/005; G10L 17/22; H04L 63/08; G06F 21/32; H04W 12/003; H04W 12/06
(Continued)

(56) References Cited

U.S. PATENT DOCUMENTS 6,339,706 B1 1/2002 Tillgren
6,957,185 B1 * 10/2005 Labaton .................. G10L 15/02
704/500

(Continued)

FOREIGN PATENT DOCUMENTS

CN 101030994 9/2007
CN 101241537 8/2008
(Continued)

OTHER PUBLICATIONS

Chinese Office Action dated Aug. 15, 2017 issued in counterpart application No. 201380045946.3, 20 pages.
(Continued)

*Primary Examiner* — Martin Lerner
(74) *Attorney, Agent, or Firm* — The Farrell Law Firm, P.C.

(57) ABSTRACT

A method of connecting a service between a device and at least one other device is provided. The method includes recording, by the device, a user voice input in a state where a voice command button has been input, outputting first information based on the recorded user voice when an input of the voice command button is cancelled, receiving, by the device, second information corresponding to the first information, recognizing a service type according to the first information and the second information, connecting the device to a subject device in an operation mode of the device determined according to the recognized service type, and performing a service with the connected subject device.

8 Claims, 12 Drawing Sheets

(51) Int. Cl.
  *G10L 21/00* (2013.01)
  *H04W 12/06* (2009.01)
  *H04M 1/725* (2006.01)
  *H04W 12/00* (2009.01)

(52) U.S. Cl.
  CPC ......... *H04W 12/003* (2019.01); *H04W 12/06* (2013.01); *G10L 2015/223* (2013.01); *H04M 2250/74* (2013.01); *H04W 12/00504* (2019.01)

(58) Field of Classification Search
  USPC ..... 704/246, 270, 270.1, 273, 275; 709/237; 726/4
  See application file for complete search history.

(56) References Cited

U.S. PATENT DOCUMENTS

| | | | |
|---|---|---|---|
| 7,260,529 B1 | 8/2007 | Lengen | |
| 7,565,297 B2 | 7/2009 | Labaton | |
| 7,826,945 B2 | 11/2010 | Zhang | |
| 8,099,289 B2 | 1/2012 | Mozer et al. | |
| 8,195,467 B2 | 6/2012 | Mozer | |
| 8,219,028 B1 | 7/2012 | Flamholz | |
| 8,416,767 B2 | 4/2013 | Wang | |
| 8,463,182 B2 | 6/2013 | Mallinson | |
| 8,538,333 B2 | 9/2013 | Jaln | |
| 8,699,944 B2 * | 4/2014 | Malamud | H04L 63/0861 704/270 |
| 8,750,473 B2 * | 6/2014 | Cook | G06F 3/16 379/93.37 |
| 8,902,785 B2 * | 12/2014 | Xia | H04W 72/04 370/252 |
| 9,082,413 B2 | 7/2015 | Herring | |
| 9,805,733 B2 * | 10/2017 | Park | G10L 15/22 |
| 2001/0039619 A1 * | 11/2001 | Lapere | G06F 21/32 713/186 |
| 2002/0077095 A1 | 6/2002 | Fu | |
| 2003/0208356 A1 | 11/2003 | King | |
| 2004/0022374 A1 * | 2/2004 | Charlet | H04M 3/382 379/88.19 |
| 2004/0209569 A1 | 10/2004 | Heinonen | |
| 2004/0243562 A1 | 12/2004 | Josenhans | |
| 2004/0248513 A1 | 12/2004 | Glass | |
| 2005/0010417 A1 | 1/2005 | Holmes | |
| 2005/0090232 A1 * | 4/2005 | Hsu | H04L 63/08 455/411 |
| 2005/0182631 A1 | 8/2005 | Lee et al. | |
| 2006/0185007 A1 | 8/2006 | Hourselt | |
| 2006/0220784 A1 | 10/2006 | Wang | |
| 2006/0282649 A1 | 12/2006 | Malamud et al. | |
| 2007/0100634 A1 * | 5/2007 | Cooper | G10L 15/26 704/275 |
| 2007/0168674 A1 * | 7/2007 | Nonaka | G06Q 20/341 713/182 |
| 2008/0016537 A1 | 1/2008 | Little | |
| 2008/0162141 A1 | 7/2008 | Lortz | |
| 2008/0255848 A1 | 10/2008 | Yu et al. | |
| 2009/0176505 A1 | 7/2009 | Van Deventer | |
| 2009/0248838 A1 * | 10/2009 | Presetenback | H04N 7/17318 709/219 |
| 2009/0310762 A1 | 12/2009 | Vellus | |
| 2010/0110837 A1 * | 5/2010 | Jung | H04B 11/00 367/137 |
| 2010/0210287 A1 | 8/2010 | De Vries | |
| 2010/0279612 A1 | 11/2010 | Harwood | |
| 2010/0286983 A1 | 11/2010 | Cho | |
| 2010/0330909 A1 | 12/2010 | Maddern | |
| 2010/0332236 A1 | 12/2010 | Tan | |
| 2011/0003585 A1 | 1/2011 | Wang | |
| 2011/0044438 A1 | 2/2011 | Wang | |
| 2011/0074693 A1 | 3/2011 | Ranford | |
| 2011/0111741 A1 | 5/2011 | Connors | |
| 2011/0217950 A1 * | 9/2011 | Kozlay | H04W 12/003 455/410 |
| 2011/0314153 A1 * | 12/2011 | Bathiche | H04L 63/08 709/225 |
| 2012/0084834 A1 * | 4/2012 | Brown | H04W 4/021 709/219 |
| 2012/0184372 A1 | 7/2012 | Laarakkers | |
| 2012/0233644 A1 | 9/2012 | Rao | |
| 2012/0260268 A1 | 10/2012 | Mirkin | |
| 2013/0067288 A1 | 3/2013 | Louie | |
| 2013/0337739 A1 | 12/2013 | Bernsen | |

FOREIGN PATENT DOCUMENTS

| | | |
|---|---|---|
| CN | 101599270 | 12/2009 |
| CN | 102483915 | 5/2012 |
| KR | 1020060079660 | 7/2006 |
| KR | 1020090044093 | 5/2009 |

OTHER PUBLICATIONS

European Search Report dated May 8, 2019 issued in counterpart application No. 19152424.8-1216, 8 pages.

\* cited by examiner

FIG. 5

| Client | Waveform | Timestamp | Address | Raw data |
|---|---|---|---|---|
| A | | 20120222010014502 | 10.23.12.123 | ......... |
| B | | 20120222010014610 | 123.23.12.123 | ......... |
| C | | 20120222010014635 | 225.1.23.120 | ......... |
| D | | 20120222010014733 | 10.99.10.45 | ......... |
| E | | 20120222010014740 | 102.101.20.9 | ......... |

METHOD AND APPARATUS FOR CONNECTING SERVICE BETWEEN USER DEVICES USING VOICE

PRIORITY

This application is a Continuation of, and claims priority under 35 U.S.C'. § 120 to, U.S. patent application Ser. No. 13/934,839, which was filed on Jul. 3, 2013, issued on Oct. 31, 2017 as U.S. Pat. No. 9,805,733, and claimed priority under 35 U.S.C. § 119(a) to a Korean patent application filed on Jul. 3, 2012 in the Korean Intellectual Property Office and assigned Serial No. 10-2012-0072290, the entire contents of all of which are incorporated herein by reference.

BACKGROUND OF THE INVENTION

1. Field of the Invention

The present invention relates generally to a method and apparatus for connecting a service between user devices, and more particularly, to a method and apparatus for connecting a service between user devices according to a user voice input through the user devices.

2. Description of the Related Art

Along with a recent development of digital technologies, various portable user devices capable of performing communication and processing personal information, such as mobile communication terminals, Personal Digital Assistants (PDAs), electronic organizers, smart phones, tablet Personal Computers (PCs), etc., are being introduced. Such user devices are not required to remain in their respective traditional unique usage areas, but are reaching a mobile convergence phase covering usage areas of other terminals. For example, a user device may include various functions for performing voice calls, video calls, text message transmission, such as a Short Message Service (SMS) and a Multimedia Message Service (MMS) message transmission, electronic organizer functions, photography, e-mail transmission and reception, broadcast replay, video replay, Internet, electronic commerce, music replay, schedule management, Social Networking Service (SNS), a friend search service, a messenger, a dictionary, a game, and a Wireless Local Area Network (WLAN) link.

In particular, along with the development of wireless communication technologies, various wireless connections that may be used in providing a link service between user devices are being developed and applied. For example, wireless connection technologies for supporting a link service between user devices, such as a Bluetooth, Zighee and Ultra-Wideband (UWB), are being developed.

In order to use such wireless connection technologies, complicated processes, such as a search selection and authentication of a peripheral device, connection to the peripheral device, selection of data to be shared, and selection of transmission of the selected data, are required.

For example, in order to connect a service between user devices, one of the user devices is first operated as a master device (i.e., a master), in a state where user devices to be connected to each other recognize each others' addresses, and thereafter another user device is operated as a slave device a slave), so as to perform a connection request to the already executed master. Further, the master performs a connection by checking a separate preset code to identify whether the slave is a slave that intends to be connected to the master.

Likewise, when intending to use a service connection function between existing user devices, many user interactions are required to perform necessary authentication and service connection, and thus the service connection between the user devices becomes inconvenient to users. Therefore, there is a need for a service for improving user convenience by simplifying complicated pairing procedure of various wireless connections, in order to perform a link service between user devices.

SUMMARY OF THE INVENTION

The present invention has been made in order to address at least the above problems and provide at least the advantages described below. An aspect of the present invention is to provide a method and apparatus for connecting a service between user devices using a voice capable of simplifying a procedure for service connection between at least two user devices.

According to an aspect of the present invention, a method of connecting a service between a device and at least one other device is provided. The method includes recording, by the device, a user voice input in a state where a voice command button has been input; outputting first information based on the recorded user voice when an input of the voice command button is cancelled; receiving, by the device, second information corresponding to the first information; recognizing a service type according to the first information and the received second information; connecting the device to a subject device in an operation mode of the device determined according to the recognized service type; and performing a service with the connected subject device.

According to another aspect of the present invention, a method of connecting a service between a device and at least one other device using a voice is provided. The method includes recording, by the device, a timestamp and waiting for reception of an input of a user voice when a voice command button is input; receiving input of the user voice, recording the received user voice, and generating recording data based upon the received user voice; generating, when the input of the voice command button is cancelled, voice information according to the recorded timestamp, the recording data and a device address of the device; transmitting the generated voice information to a server; receiving service information from the server; checking an operation mode of the device, the device address of a subject device for connection and a type of an execution service according to the service information; connecting the device to a subject device according to the checked operation mode; and performing, upon connecting to the subject device, a service with the connected subject device according to the checked type of the execution service and according to the checked operation mode.

According to another aspect of the present invention, a method of connecting a service using a voice is provided. The method includes recording, by a first device, a timestamp and waiting for reception of an input of a user voice when a voice command button is input; receiving input of the user voice and generating recording data by recording the input user voice; generating, when the input of the voice command button is cancelled, first voice information that includes the recorded timestamp, the recording data, and a device address of the device; loading the generated voice information as audio data and outputting the loaded audio data through a speaker of the first device; receiving second voice information output through a speaker of a second device through a microphone of the first device; checking, from the first voice information and the second voice information, an operation mode of the first device, a device address of the second device for establishing a connection with the first device, and a type of an execution service; connecting the first device to the second device according to the operation mode; and performing, upon connecting the first device to the second device, a service according to the type of the execution service and according to the operation mode of the first device.

According to another aspect of the present invention, a method of connecting a service between a device and at least one other device using a voice is provided. The method includes recording a timestamp and waiting for reception of an input of a user voice when a voice command button is input; receiving input of the user voice and generating recording data by recording the input user voice; generating, when input of the voice command button is cancelled, an authentication key having a unique string by using a voice waveform of the recording data and the recorded timestamp; changing device information for identifying the device using the authentication key; searching for a subject device to be connected with the device having device information corresponding to the authentication key at a preset communication mode; performing a connection between the device and the subject device through transmission of a connection request and reception of a connection approval; and performing, upon performing the connection with the subject device, the service.

According to another aspect of the present invention, a device for supporting a service connection between the device and at least one other device by using an input voice is provided. The device includes a storage unit for storing at least one program; and a controller for executing the at least one program to record a user voice input in a state where voice command button has been input, output first information based on the recorded user voice when an input of the sir voice command button is cancelled, receive second information corresponding to the first information, recognize a service type according to the first information and the second information, connect the device to a subject device in an operation mode of the device determined according to a service type, and perform a service with the connected subject device.

According to another embodiment of the present invention, a non-transitory computer-readable recording medium having recorded a program for performing a method of connecting a service between a device and at least one other device is provided. The method includes recording, by the device, a user voice input in a state where a voice command button has been input; outputting first information based on the recorded user voice when an input of a voice command button is cancelled; receiving, by the device second information corresponding to the first information; recognizing a service type according to a the first information and the received second information; determining an operation mode of the device according to the recognized service type; and performing a service connection between the device and a subject device according to the determined operation mode.

Another aspect of the present invention provides a computer program including instructions arranged, when executed, to implement a method, system and/or apparatus, in accordance with any one of the above-described aspects.

Another aspect of the present invention provides a machine-readable storage that stores such a program.

Other aspects, advantages, and salient features of the invention will become apparent to those skilled in the art from the following detailed description, which, taken in conjunction with the annexed drawings, describe example embodiments of the invention.

BRIEF DESCRIPTION OF THE DRAWINGS

The above and other aspects and features and advantages of the present invention will be more apparent from the following detailed description hi conjunction with the accompanying drawings, in which:

FIG. 5 illustrates an example where voice information used in a service connection of user devices is stored according to an embodiment of the present invention;

DETAILED DESCRIPTION OF EMBODIMENTS OF THE PRESENT INVENTION

Figure 1:
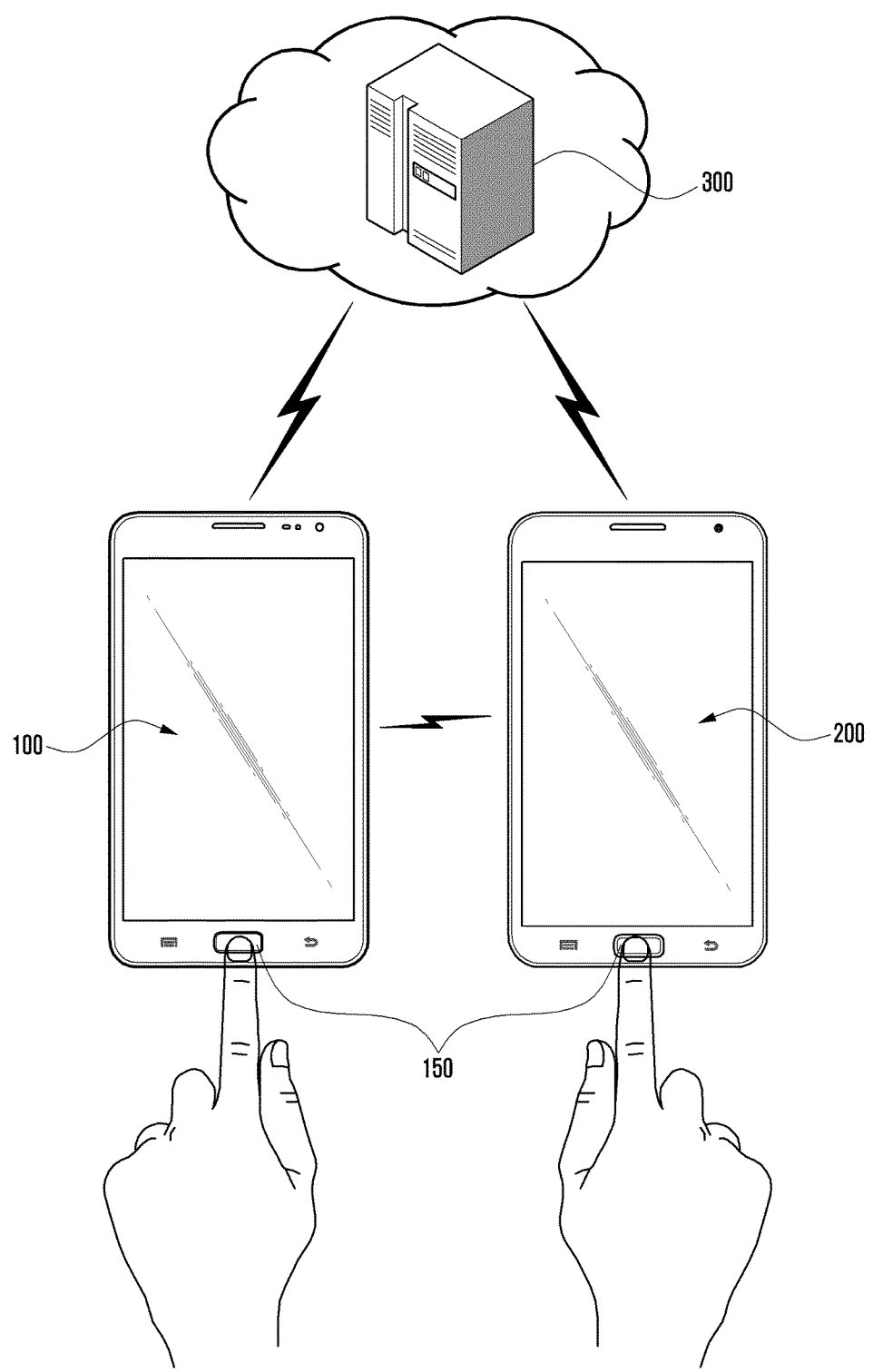
FIG. 1 schematically illustrates an operation of connecting a service between user devices according to an embodiment of the present invention.

Embodiments of the present invention are described as follows with reference to the accompanying drawings in detail. The following description is provided to assist in a comprehensive understanding of the present invention, as defined by the claims. The description includes various specific details to assist in that understanding but these are to be regarded as merely examples. Accordingly, those of ordinary skill in the art will recognize that various changes and modifications of the embodiments described herein can be made without departing from the scope of the invention.

The terms and words used in the following description and claims are not limited to the bibliographical meanings, but, are merely used by the inventor to enable a clear and consistent understanding of the invention. Accordingly, it should be apparent to those skilled in the art that the following description of the embodiments of the present invention is provided for illustration purpose only and not for the purpose of limiting the invention as defined by the appended claims.

The same or similar reference numbers may be used throughout the drawings to refer to the same or similar parts. Detailed descriptions of well-known processes, functions, constructions and structures may be omitted for clarity and conciseness, and to avoid obscuring the subject matter of the present invention.

Throughout the description and claims of this specification, the words "comprise", "include" and "contain" and variations of the words, for example "comprising" and "comprises", means "including but not limited to", and is not intended to (and does not) exclude other elements, features, components, integers, steps, processes, functions, characteristics, and the like.

Throughout the description and claims of this specification, the singular (e.g. "a", "an", and "the") encompasses the plural unless the context otherwise requires. Thus, for example, reference to "an object" includes reference to one or more of such objects.

Elements, features, components, integers, steps, processes, functions, characteristics, and the like described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, process, activity or step and X is some means for carrying out that action, activity or step) encompasses means X adapted, configured, or arranged specifically, but not exclusively, to do Y.

The present invention relates to a method, apparatus and system for connecting a service between user devices (e.g. connecting the user devices to enable the user devices to participate in a service), and more particularly, to a method, apparatus and system for connecting a service between user devices using a user voice input through the user devices. According to embodiments of the present invention, an authentication process for connecting the user devices, and for connecting a service between the connected user devices, is automatically executed using a user voice input in the user devices.

According to embodiments of the present invention, a user inputs a command corresponding to a service to be executed in at least two user devices. Specifically, the command is input to devices that the user intends to be connected with each other through the service (e.g., through a device connection, data sharing after device connection, execution of a designated function after device connection (e.g., a speaker mode, WiFi display, etc.)). The command may be input in the form of a voice command. Then, respective user devices determine a master mode (or Access Point (AP) mode) and a slave mode (or non-AP mode), and automatically execute a service connection corresponding to the voice command in the determined mode. In this manner, respective user devices may automatically perform mutual connection according to a user's voice command, and perform a service using the connection.

According to embodiments of the present invention, the device operating in the master mode may be a device, from among at least two user devices, in which an input for performing a service connection process has been performed via a voice command button, and may be device that transmits data. Further, the device operating in the slave mode is a device, from among the at least two user devices, in which an input for performing a service connection process is performed later (i.e., later than a corresponding input in the master device) via a voice command button, and may be a device that receives data from the device of the master mode.

According to an embodiment of the present invention, authentication for a service connection between user devices may be performed using a voice waveform input from user, and the determination of the master mode and the slave mode of the connected respective user devices may be performed through the time analysis of the voice input from user. Further, the service to be executed after being connected by respective user devices may be determined through the parameter analysis (or through a command) corresponding to a voice input from user. Authentication for a service connection between such devices may be performed by communicating or linking with a server, or by using data exchanged between devices.

For example, when linked with the server, a device (e.g., a first device) records a time stamp when a voice command button is input or actuated (e.g., when a user pushes the voice command button). The first device waits for the reception of the user voice input while actuation of the voice command button is maintained (e.g., while the voice command button remains pushed by the user), and generates recording data by recording a user voice input through a microphone. When actuation of the voice command button is cancelled (e.g., when a user releases the pushed voice command button), the first device generates voice information including the time stamp, the recording data and the device address of the first device, and transmits the generated voice information to the server. In response, the first device receives service information corresponding to the voice information from the server, and checks the operation mode of the first device, the device address of a second device to which the first device is to be connected, and the type of the executed service from the received service information. Further, a connection is established between the first device and the second device according to the operation mode, and thereafter the first device performs a service according to the executed service type according to the operation mode when connected with the second device.

Further, when data is directly exchanged between devices themselves, the first device records the time stamp at the time when the voice command button is actuated, awaits reception of the user voice input, and generates recording data by recording a voice input by the user through a microphone. When actuation of the voice command button is canceled, the first device generates first voice information including the time stamp, the recording data and the device address of the first device, generates a sound using the generated voice information, and outputs the sound corresponding to the voice information through a speaker so that a second adjacent device may detect the sound. In response, the second device outputs a sound corresponding to second voice information through a speaker, so that the first device may detect the sound through a microphone and receive the second voice information as an input. The first device checks the operation mode of the first device, the device address of the second device to which the first device is to be connected, and the type of the execution service from the first voice information and the second voice information. Further, a connection is established between the first device and the second device, and thereafter the first device performs a service according to the type of the executed service corresponding to the operation mode when connected with the second device.

Hereinafter, the configuration of a user device and a method of controlling the user device according to an embodiment of the present invention are described with reference to the drawings. The configuration of the user device and the method of controlling operation thereof according to an embodiment of the present invention are not limited to the description below, and thus it should be noted that the present invention may be applied to various other embodiments, for example, based on the embodiments below.

FIG. 1 is a diagram schematically illustrating an operation of connecting a service between user devices according to an embodiment of the present invention.

As illustrated in FIG. 1, a system for performing a service connection based on a user voice according to an embodiment of the present invention includes a first user device 100, a second user device 200 and a server 300. In the present example, a service connection operation is described using two user devices 100 and 200. However, embodiments of the present invention are not limited thereto. For example, service connections between two or more user devices are also possible in accordance with embodiments of the present invention.

The first user device 100 and the second user device 200 include a voice command button 150 for instructing the respective devices 100 and 200 to wait for reception of a voice input from user in order to perform service connection based on a voice. In accordance with embodiments of the present invention, the voice command button 150 may be implemented in various ways, for example, in the form of a hardware button, a soft interface (e.g., a Graphical User Interface, GUI), etc. A user may input a voice (e.g., a voice command) while the voice command button 150 of the first user device 100 and the second user device 200 is pushed.

The first user device 100 and the second user device 200 wait for reception of a user voice input upon sensing an input via the voice command button 150. At this time, the first user device 100 and the second user device 200 may record the value of the time at which the voice command button 150 is actuated as a timestamp. Further, the first user device 100 and the second user device 200 record a user voice (generate recording data) input while the voice command button 150 is pushed, and performs voice recognition on the recorded voice (recording data) when actuation of the voice command button 150 is canceled. The first user device 100 and the second user device 200 may transmit voice information including recording data (particularly, the waveform), timestamp, and device identifier to the server 300 when a command for establishing a connection between user devices is detected as a result of voice recognition.

The first user device 100 and the second user device 200 transmit voice information to the server 300, and receive service information corresponding to the voice information from the server 300. Further, when receiving service information from the server 300, the first user device 100 and the second user device 200 establish a connection such that the first user device 100 and the second user device 200 are mutually connected according to the service information, and the first user device 100 and the second user device 200 execute the service. At this time, the first user device 100 and the second user device 200 analyze the received service information, and determine the service type, connection information (device information of the device to be connected), execution information, etc. Further, the first user device 100 and the second user device 200 determine the master mode or slave mode according to the service type, perform connection according to a communication method that is set with another device according to connection information in a determined mode, and execute a service according to execution information, when connected with a device corresponding to connection information.

According to an embodiment of the present invention, the communication method may include various wireless communication methods, for example, a Wireless Local Area Network (WLAN) connection, Bluetooth connection, WiFi direct connection, WiFi display connection, Near Field Communication (NFC) connection, etc. The communication method used in the connection may be determined using any suitable determination scheme. For example, the method may be determined according to a user setting or a default setting, may be automatically determined according to a recently performed connection method, or may be randomly determined.

According to embodiments of the present invention, the execution information represents the type of a service to be executed. The type of service to be executed may include, for example, data sharing (transmission), a left and right speaker linkage function, and information indicating certain functions (operations) of the input and output linkage function, etc.

The server 300 searches for at least two devices having transmitted the same recording data during the same time zone (e.g., period), and determines the searched devices as a set of devices for service connection between the searched devices. Further, information on the service for supporting service connection between a set of determined devices may be respectively transmitted to the group of devices.

Specifically, the server 300 stores voice information from various user devices, for example, the first user device 100 and the second user device 200. In particular, the server 300 receives voice information from the user devices (e.g., the first user device 100 and second user device 200 of FIG. 1), and may store the received voice information in the database by dividing or categorizing the received voice information according to device. At this time, when storing the voice information, the server 300 parses the voice information to extract device information, recording data (waveform), timestamp, connection information (e.g., device addresses), and raw data, etc. and then stores the information.

When voice information is received from the user device, the server 300 compares and analyzes the voice waveform according to the voice information for connection authentication of the user device having transmitted voice information. For example, a voice waveform coinciding with the voice waveform of the received voice information is compared and detected in the database.

When the same voice waveform (e.g., a matching voice waveform) is detected, the server 300 compares timestamps in the voice information sets of respective user devices having the same voice waveform, and determines the service type of the operation mode of each user device according to the time difference according to each timestamp. The server 300 recognizes a voice parameter (command) from the recording data of the voice information and generates execution information. Further, the server 300 respectively generates service information to be transmitted to each user device using the service type, connection information and execution information per user device, and respectively transmits the generated service information to the user devices determined as having the same voice waveform. As this time, assuming that the determined user devices are the first user device 100 and the second user device 200, another service information set may be provided to the first user device 100 and the second user device 200.

For example, the service information transmitted to the first user device 100 may be service type information indicating operation at the master mode, connection information indicating the device identifier (e.g., the device address, etc.) of the second user device 200, and the first service information having the execution information on the service to be executed. Further, the service information transmitted to the second user device 200 may be service type information indicating operation at the slave mode, connection information indicating the device identifier (e.g., the device address, etc.) of the first user device 200, and the second service information having the execution information on the service to be executed.

According to an embodiment of the present invention having the above configuration, respective user devices 100 and 200 provide a hardware or software type voice command button 150 for supporting service connection based on a user voice. The user pushes respective voice command buttons 150 of two or more user devices to be mutually connected within a simultaneous or preset error range as in the first user device 100 and the second user device 200. Further, users input (via speech) a desired voice service command and cancel the pushed state of respective voice command buttons 150 after pushing respective voice command buttons 150.

The first user device 100 and the second user device 200 perform voice recognition on the user voice, which is input through a microphone and is stored at the time of detecting the cancellation of the input based on the voice command button 150, through a user voice recognition module. Further, if a predefined command (e.g., "device connection") for initiating a service connection between devices is detected in the result according to the voice recognition, voice information needed in service connection, such as recording data, timestamps and device identifier (e.g., the device address), may be respectively transmitted to the server 300.

If voice information is received from user devices (e.g., the first user device 100 and the second user device 200), the voice information is stored, and the respective stored information sets are compared, and thereby a search for at least two user devices having related voice information sets is performed. For example, the server 300 may receive the same waveforms (or similar voice waveforms within a certain error range) or may search for two or more user devices having similar timestamps within a certain error range. The server 300 may use any suitable technique, for example a heuristic approach when comparing voice information. That is, the server 300 does not necessarily search for completely coincided or matched data (voice information), but may search for sufficiently similar data (same or similar data within a certain error range). For example, the server 300 may use a method of analyzing only certain variables (e.g., relatively important variables) without necessarily considering all variables at the initial step of analysis, gradually extending the range of variables, and narrowing corresponding data. Hereinafter, coinciding data is determined based upon the comparison of at least two sets of data for the convenience of explanation.

Further, the server 300 may analyze recording data of the voice information when two or more user devices having the related voice information are searched. At this time, respective searched voice information sets are analyzed in the recording data analysis. In one example according to an embodiment of the present invention, recording data of respective voice information sets may be the same recording data input from one user, and thus only one recording data set may be analyzed. For example, the server 300 may recognize a voice command (or a voice parameter) (for example, "device connection", "device connection current image file transmission" "device connection WiFi display", "device connection speaker", "device connection phonebook transmission", etc.) through the analysis (e.g., voice recognition) of recording data. Accordingly, the server 300 may recognize the type of a service intended to be performed through connection between devices.

When the coinciding user device and the types of services intended to be performed are determined according to the above operation, the server 300 generates service information including the service type, connection information and execution information by determined user devices, and transmits the generated service information to each user device.

A set of user devices (e.g., the first user device 100 and the second user device 200), which respectively receive service information from the server 300, determines the master mode or slave mode from the received service information according to the service type, and be connected to a user device (e.g., the first user device or the second user device 200) of an object to be connected according to the connection information at the corresponding mode, and may execute the service according to the execution information. For example, the first user device 100 and the second user device 200 may form a wireless LAN link, and when a mutual connection is established, the user device determined as master may transmit the currently displayed image file to the opponent user device. Further, the user device determined as master may operate as a left speaker and the user device determined as slave may operate as a right speaker (or vice versa), thereby respectively outputting audio of a media file replayed in the master device. Further, the user device determined as master may operate as an input means and the user device determined as slave may operate as a display means so that information input by the master user device may be displayed through the slave user device. Further, data displayed in the user device determined as a master may be transmitted to the user device determined as a slave so that the data displayed in the master user device may be shared with the slave user device so as to be displayed.

Figure 2:
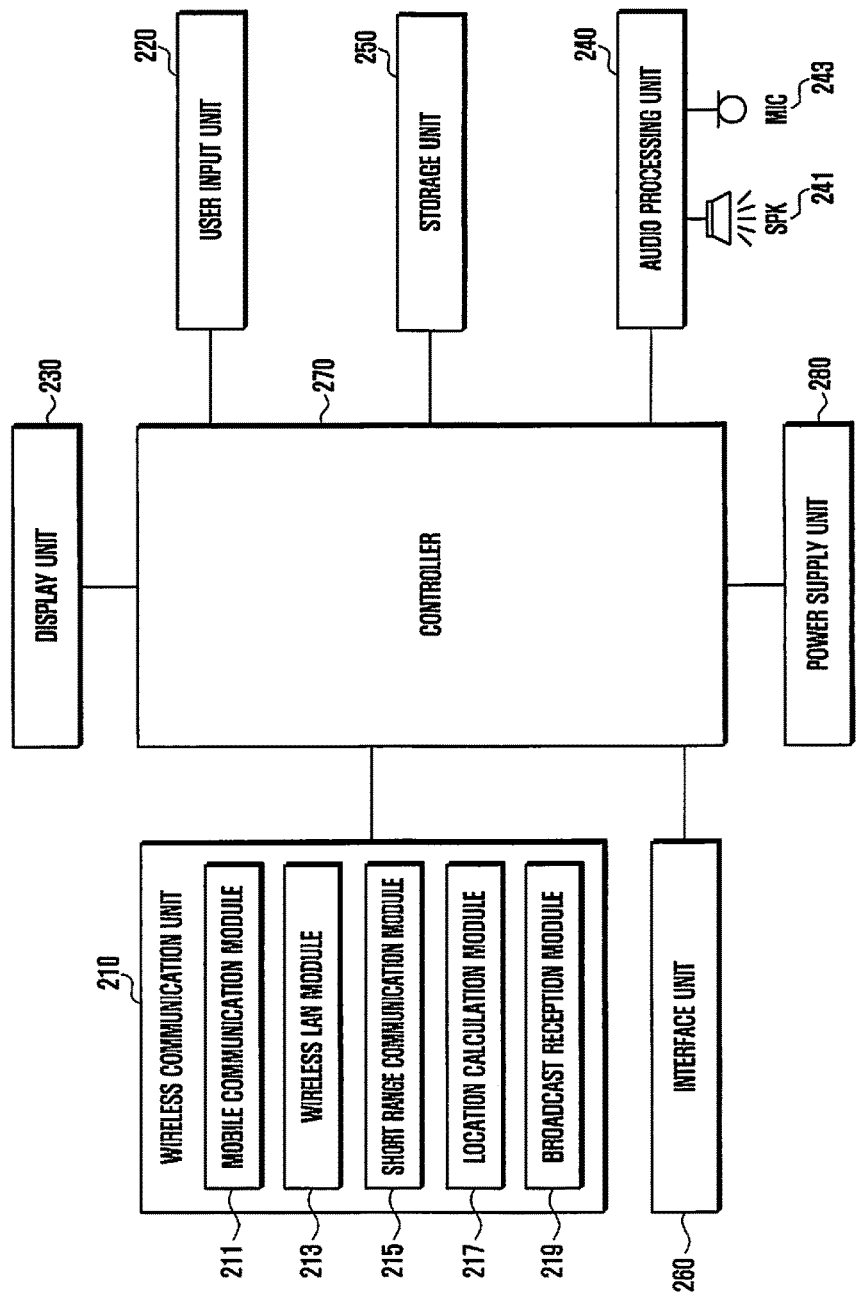
FIG. 2 schematically illustrates a configuration of a user device according to an embodiment of the present invention.

FIG. 2 is a diagram schematically illustrating a configuration of a user device according to an embodiment of the present invention. In FIG. 2, the user device represents the first user device 100 and the second device 200, and the configuration of FIG. 2 may be implemented to both the first user device 100 and the second user device.

Referring to FIG. 2, a user device according to an embodiment of the present invention may include a wireless communication unit 210, a user input unit 220, a display unit 230, an audio processing unit 240, a storage unit 250, an interface unit 260, a controller 270 and a power supply unit 280. In certain embodiments of the present invention, one or more of the essential components of the user device illustrated in FIG. 2 may be omitted. Therefore, a user device according to certain alternative embodiments of the present invention may include more or fewer components than those illustrated in FIG. 2.

The wireless communication unit 210 includes at least one module that allows wireless communication between the user device and a wireless communication system or between the user device and a network where the user device is located. For example, the wireless communication unit 210 may include one or more of a mobile communication module 211, a wireless local area network. (WLAN) module 213, a short range communication module 215, a location calculation module 217, and a broadcast reception module 219.

The mobile communication module 211 transmits and receives wireless signals with at least one of a base station, an external device, and a server on a mobile communication network. The wireless signal may include various forms s of data according to transmission and reception of a voice call signal, a video call signal or a text/multimedia message. The mobile communication module 211 transmits voice information to a predefined server 300 through the mobile communication network, and receives service information corresponding to the voice information according to the service connection mode of the user device. According to an embodiment of the present invention, the voice information may include recording data of user voice and related information that is necessary for performing a service connection between user devices. The related information may include the timestamp and the user device's identification information (e.g., address, identifier, phone number, etc.). Further, according to an embodiment of the present invention, the service information includes mode information (e.g., master mode or slave mode) determined for the user device, function information to be performed in the determined mode, and device information for the user device of the device to be connected for service connection.

The wireless LAN module 213 is a module for performing a wireless Internet connection and for forming a wireless LAN link with another user device, and may be internally or externally installed in the user device. Some examples of wireless Internet technologies are wireless LAN (WLAN), WiFi, Wireless broadband (Wibro), World interoperability for Microwave Access (Wimax), and High Speed Downlink Packet Access (HSDPA). The wireless LAN module 213 may transmit voice information defined in the present invention or receive service information from the server 300 through wireless Internet. When the connection method for service connection of the user device is set to the wireless LAN s method, the wireless LAN module 213 forms a wireless LAN link with the user device corresponding to the service information.

The wireless communication module 215 is a module for performing short range communication. Some examples of short range communications include Bluetooth, Radio Frequency IDentification (RFID), InfraRed Data Association (IrDA), Ultra WideBand (UWB), ZigBee, and Near Field Communication (NFC). If the connection method for service connection of the user device is set to a short range communication method, the short range communication module 215 may form a short range communication link with the user device corresponding to the service information.

The location calculation module 215 is a module for acquiring the location of the user device, and a representative example thereof is a Global Position System (UPS). The location calculation module 215 may calculate distance information from three or more base stations (or satellites) and accurate time information and then apply trigonometry to the calculated information, thereby acquiring the three-dimensional current location information according to latitude, longitude and altitude. Further, the location calculation module 215 may calculate location information by continually receiving the current location of the user device in real time from three or more satellites. The location information of the user device may be acquired in various methods.

The broadcast reception module 219 receives a broadcast signal (e.g., a TeleVision (TV) broadcast signal, a radio broadcast signal, a data broadcast signal, etc.) and/or the broadcast-related information (e.g., information related with a broadcast channel, broadcast program or broadcast service provider) from an external broadcast management server through a broadcast channel (e.g., a satellite channel, a terrestrial channel, etc.). The broadcast signals received through the reception module 219 according to an embodiment of the present invention may be transmitted (or streamed) to the opponent user device and then be displayed.

The user input unit 220 generates input data for operation control of the user device by a user. The user input unit 220 may include one or more of a keypad, a dome switch, a touch pad (constant voltage/constant current), a jog wheel, a jog switch, etc. In particular, the user input unit 220 may include a voice command button 150, for example, of a hardware or soft interface type that initiates the process for a voice-based service connection of the present invention.

The display unit 230 displays (outputs) information processed in the user device. For example, if the user device is at a calling mode, a calling-related to User Interface (UI) or Graphic User Interface (GUI) is displayed. Further, the display unit 230 displays a photographed or/and received image or UI and GUI when the user device is operating in a video call mode or a photographing mode. The display unit 230 displays a UI or GUI related with an internally or externally collected message. The display unit 230 may display an execution screen executed at the time of a voice-based service connection of the present invention. For example, when the voice command button 150 is input, a UI or GUI, which is related with a guide screen that guides a voice input, an authentication processing screen according to authentication performance by an input user voice, and a service execution screen of mode information determined according to service information, device information of a device to be connected, execution information of a connected device and an executed service, etc., may be displayed.

The display unit 230 may include at least one of a Liquid Crystal Display (LCD), a Thin Film Transistor-Liquid Crystal Display (TFT LCD), a Light Emitting Diode (LED), an Organic LED (OLED), an Active Matrix OLED (AMOLED), a flexible display, a bended display, and a three-dimensional (3D) display. Some of these displays may be implemented as a transparent display (including either of a transparent type or a light-transmitting type transparent display), so that an opposite side of the display may also be viewed.

According to an embodiment of the present invention, when the display unit 230 and a touch panel for sensing a touch operation form a mutual layer structure (hereinafter, referred to as a "touch screen"), the display unit 230 may also be used as an input device as well as an output device. In this case, the touch panel may be configured to convert changes of pressure applied to a certain part of the display unit 230 or capacitance generated on a certain part of the display unit 230 into electric input signals. The touch panel may be configured to detect pressure corresponding to the touch, as well as detect the touched location and area. When a touch input for the touch panel is received, the corresponding signals are transmitted to a touch controller (not shown). The touch controller processes the signals and transmits corresponding data to the controller 270. As such, the controller 270 is informed of which part of the display unit 230 has been touched.

The audio processing unit 240 transmits audio signals input from the controller 270 to the speaker 241, and transmits audio signals such as voice input from the microphone 243 to the controller 270. The audio processing unit 240 converts voice/sound data into audible sound through the speaker according to the control of the controller 270, and converts audio signals such as a voice received from the microphone 243 into digital signals so as to transmit the converted signals to the controller 270. In particular, the audio processing unit 240 according to embodiments of the present invention outputs sound containing voice information (particularly, recording data (voice waveform), timestamp, etc.) through the speaker 241 under control of the controller 270, receives sounds containing voice information, and transmits the sounds to the controller 270. According to an embodiment of the present invention, at least one of the audio processing unit 240 and the speaker 241 includes an additional circuit or electronic parts (e.g., a resistor, condenser, etc.) so that output sounds are input through the microphone 243 of another user device that exists in an adjacent area.

The speaker 241 may output audio data that is received from the wireless communication unit 210 while operating in a calling mode, recording mode, a voice recognition mode, a broadcast reception mode, etc., or output audio data is stored in the storage unit 250. The speaker 241 outputs sound signals related with a function performed in the user device (e.g., a replay of a calling signal reception sound, a message reception sound, and music content, etc.). The speaker 241 may output sounds including voice information according to a predetermined output intensity according to an embodiment of the present invention, which is described in further detail herein below.

The microphone 243 receives external sound signals while operation in the calling mode, recording mode, voice recognition mode, etc., and processes the received external sound signals as electric voice data. The voice data is converted into a form that may be transmitted to a mobile station base station through the mobile communication module 211, and then the converted data is output. Various noise removing algorithms for removing noises generated in the process of receiving external sound signals may be implemented in the microphone 243. The microphone 243 may receive sounds output from the speaker (not shown) of another user device and then transmit the sounds to the controller 270 according to an embodiment of the present invention.

The storage unit 250 stores a program for processing and controlling of the controller 270, and performs a function for temporarily storing input/output data (e.g., a phone number, message, audio, still image, electronic book, moving image, voice information, log information, etc.). The use frequency for each item of the data (e.g., the use frequency of each phone number, each message and each multimedia, etc.) and the importance thereof may be stored together in the storage unit 250. Further, data about various patterns of vibrations and sounds output at the time of a touch input on the touch screen may be stored in the storage unit 250. In particular, the storage unit 250 may store a communication scheme to be executed at the time of service connection, service information received from the server 300, a service start command (e.g., "device connection", etc.), a service command (e.g., "transmit file", "share address list", "execute speaker", and "connect keyboard", etc.). According to an embodiment of the present invention, the start command and service command may be defined according to a user's settings or in any other suitable way. With respect to a service command, function information of a function to be operated by the user device (e.g., information indicating whether the user device will operate as an input means or as a display means at the time of a keyboard connection, information indicating whether the user device will be in charge of the left sound or the right sound when the speaker is executed, etc.) may be mapped together. Further, the storage unit 250 may store the platform of FIG. 3, which is described herein below.

The storage unit 250 includes at least one of a flash memory type, hard disk type, micro type and card type (e.g., Secure Digital (SD) or XD) memory, a Random Access Memory (RAM), a Static RAM (SRAM), a Read-Only Memory (ROM), an Electrically Erasable Programmable ROM (EEPROM), a Programmable ROM (PROM), a Magnetic RAM (MRAM), a magnetic disk and optical disk type memory, etc. The user device may also utilize web storage for performing a storage function of the storage unit 250 in a remote Internet location when operated.

The interface unit 260 provides a connection path to external devices connected to the user device. The interface unit 260 receives data from the external device, is supplied power to transmit power to each component inside the user device, and/or transmits data inside the user device to an external device. For example, a wired/wireless headset port, an external charger port, a wired/wireless data port, a memory card port, a port for connecting a device including an identification module, an audio Input/Output (I/O) port, a video port, an earphone port, etc. may be included in the interface unit 260.

The controller 270 controls overall operation of the user device. For example, the controller 270 performs related control and processes for voice calls, data communication, video calls, etc. The controller 270 includes a multimedia module (not shown) for playing or replaying of multimedia. The multimedia module (not shown) may be implemented in the controller 270 or may be implemented separately from the controller 270. In particular, the controller 270 may control overall operation related with automatic connection and execution of services between user devices by using a user voice input through the user device of the present invention.

For example, when a service is started by the voice command button 150, the controller 270 controls generation of voice information based on a voice input through the microphone 243, and controls voice information, which is generated at the time of sensing a cancellation by the voice command button 150, to be transmitted to the service through the wireless communication unit 210 or to be externally outputted through the speaker 241. Further, when service information is received from the server 300, the controller 270 determines the mode of the user device according to the received service information, and controls service connection and service execution according to the determined mode. Further, when sound information is received from another user device through the microphone 243, the controller 270 determines the mode of the user device according to the received voice information and controls service connection and service execution according to the determined mode. Accordingly, the controller 270 is in charge of overall control related with service connection between user devices, as well as service execution functions using voice in accordance with embodiments of the present invention. The detailed control operations of the controller 270 are described herein with respect to an operation example of a user device and control method thereof with reference to drawings.

The power supply unit 250 is supplied with external and internal power and supplies power necessary for operation of each component by control of the controller.

Though not illustrated in FIG. 2, a voice recognition module (not shown) may be stored or loaded in at least one of the storage unit 250 and the controller 270, or may be implemented as a separate component.

Further, various embodiments described in accordance with embodiments of the present invention may be implemented in software, hardware, or a recording medium that is readable by a computer or the like, or a combination thereof. According to a hardware implementation, embodiments of the present invention may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for performing other functions. In some cases, certain operations performed according to embodiments of the present invention may be performed by the controller 270. According to a software implementation, embodiments such as a procedure and function described in the present specification may be implemented as separate software modules. Each of the software modules may perform one or more functions and operations described herein.

Further, the user device of FIG. 1 of the present invention may include all devices using an application processor, a Graphic Processing Unit (CPU) and a Central Processing Unit (CPU), for example, all information communication devices, multimedia devices and their application devices that support the functions of embodiments of the present invention. For example, the user device may include various devices such as a tablet Personal Computer (PC), a smart phone, a digital camera, a Portable Multimedia Player (PMP), a media player, a portable game console, a laptop computer, and a Personal Digital Assistant (PDA) as well as mobile communication terminals operated according to each communication protocol corresponding to various communication systems. Also, methods of controlling functions according to embodiments of the present invention may be applied to various display devices such as a digital TV, Digital Signage (DS) and a Large Format Display (LFD).

Figure 3:
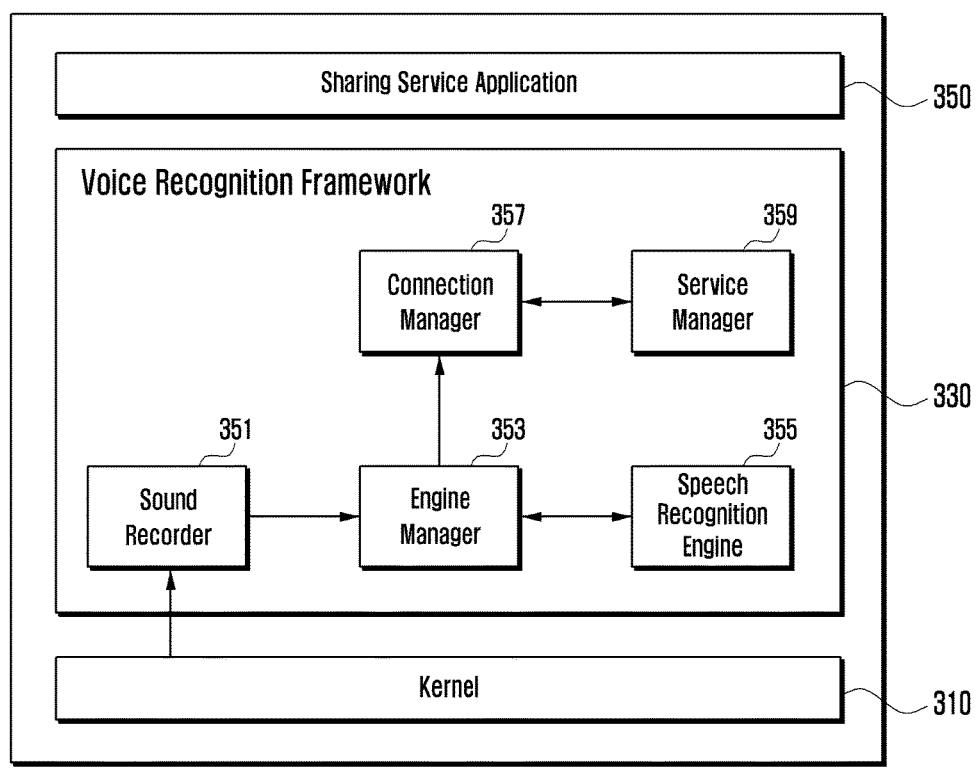
FIG. 3 schematically illustrates a platform structure of a user device for processing a function according to an embodiment of the present invention.

FIG. 3 schematically illustrates a platform structure of a user device for processing a function according to an embodiment of the present invention.

Referring to FIG. 3, the platform of the user device according to an embodiment of the present invention may include Operating System (OS) based software to perform various operations related with service connection that uses the above voice. As illustrated in FIG. 3, the user device may be designed to include a kernel 310, a voice recognition framework 330, and a sharing service application 350.

The kernel 310 is the core of the OS, and performs an operation including at least one of a hardware driver, security of hardware and processor within the device, efficient management of system resources, memory management, provision of an interface for hardware via hardware abstraction, a multi-process, and service connection management. The hardware driver within the kernel 310 includes at least one of a display driver, an input device driver, a WiFi driver, a Bluetooth driver, a USB driver, an audio driver, a power manager, a binder driver, and a memory driver.

The voice recognition framework 330 includes a program that is a basis of an application within the sharing service application 350. The voice recognition framework 330 may be compatible with any application, may reuse components, and movement and exchange may be possible. The voice recognition framework 330 may include a support program, a program for connecting other software components, etc.

For example, the voice recognition framework 330 may include a sound recorder 351, an engine manager 353, a speech recognition engine 355, a connection manager 357, and a service manager 359, etc.

The sound recorder 351 may receive input from the microphone 243, record the user's voice transmitted through the kernel 310, and generate recording data.

The engine manager 353 transmits recording data transmitted from the sound recorder 351 to the speech recognition engine 355, and transmits voice information to the connection manager 357 according to the result information transmitted from the speech recognition engine 355. The engine manager 353 may record a timestamp for the input time when the voice command button 150 is input. Further, when the analysis result indicates that the voice input is a command that requests service connection from the speech recognition engine 355 has been transmitted, the engine manager 353 may generate timestamps, the recording data and voice information including the device address of the device so as to be transmitted to the connection manager 357 and request transmission of the data to be transmitted.

The speech recognition engine 355 analyzes recording data transmitted through the engine manager 353. More specifically, the speech recognition engine 355 analyzes recording data and analyzes whether the start command that requests service connection is included. When understood as a command that requests service connection between devices from the recording data, the speech recognition engine 355 transmits the result of analysis thereof to the engine manager 353. According to an embodiment of the present invention, the speech recognition engine 355 converts input signals into a text or voice, and may be composed of a Text-To-Speech (TTS) engine for converting input text into a voice and a Speech-To-Text (SIT) engine for converting a voice into text of a message.

The connection manager 357 receives voice information from the engine manager 353, and transmits the received voice information to the server 300 through the wireless communication unit 210. Then the server 300 determines whether other devices have transmitted the same or similar recording data having a timestamp in the same time zone (e.g. period), and if there is a device having the same recording data and a timestamp of the same time zone, service information for service connection with the device is transmitted to the device. Thus, if the service information is received from the server 300, the connection manager 357 transmits the service information to the service manager 359. Further, the connection manager 357 processes a connection of the communication scheme that is set according to the device address of the device to be connected transmitted from the service manager 359. Thereafter, if a connection with the device to be connected is established, the connection manager 357 processes performance of a service related with the device to be connected according to the execution information of the service transmitted in the service manager 359.

The service manager 359 receives service information from the connection manager 357, and analyzes the received service information. The service manager 359 analyzes the operation mode of the device, the device address of the device to be connected and the type of the executed service from the service information. At this time, when the service information is received, the service manager 359 collects application information currently under operation in the device from the sharing service application 350.

The sharing service application 350 includes various programs that may be operated and displayed in the device.

Some examples thereof are a UI application for providing various menus within the device and an application that may be downloaded from an external device or through a network and then stored, and may be freely installed or deleted. Through such applications, the device can perform services such as an Internet phone service by network connection, a Video On Demand (VOD) service, a web album service, a Social Networking Service (SNS), a Location-Based Service (LBS), a map service, a web search service, an application search service, a text/multimedia message service, a mail service, an address list service, a media replay service, etc. Further, various functions, such as a game function and a schedule management function may be performed.

Furthermore, a platform according to embodiments of the present invention may further include middleware (not shown). The middleware (not shown) is located between the kernel 310 and the application layer 350, and may play a role of a medium so that data may be exchanged between other hardware or software sets. As such, the kernel 310 enables a standardized interface and support of various environments and mutual link with other affairs having different systems to be provided.

Further, the above-considered platform may be usable in various electronic devices as well as a user device according to embodiments of the present invention. Further, a platform according to embodiments of the present invention may be stored or loaded in at least one of the storage unit 250 and the controller 270 or a separate processor (not shown). Further, a separate application processor (not shown) for executing an application may be further provided in the device.

Figure 4:
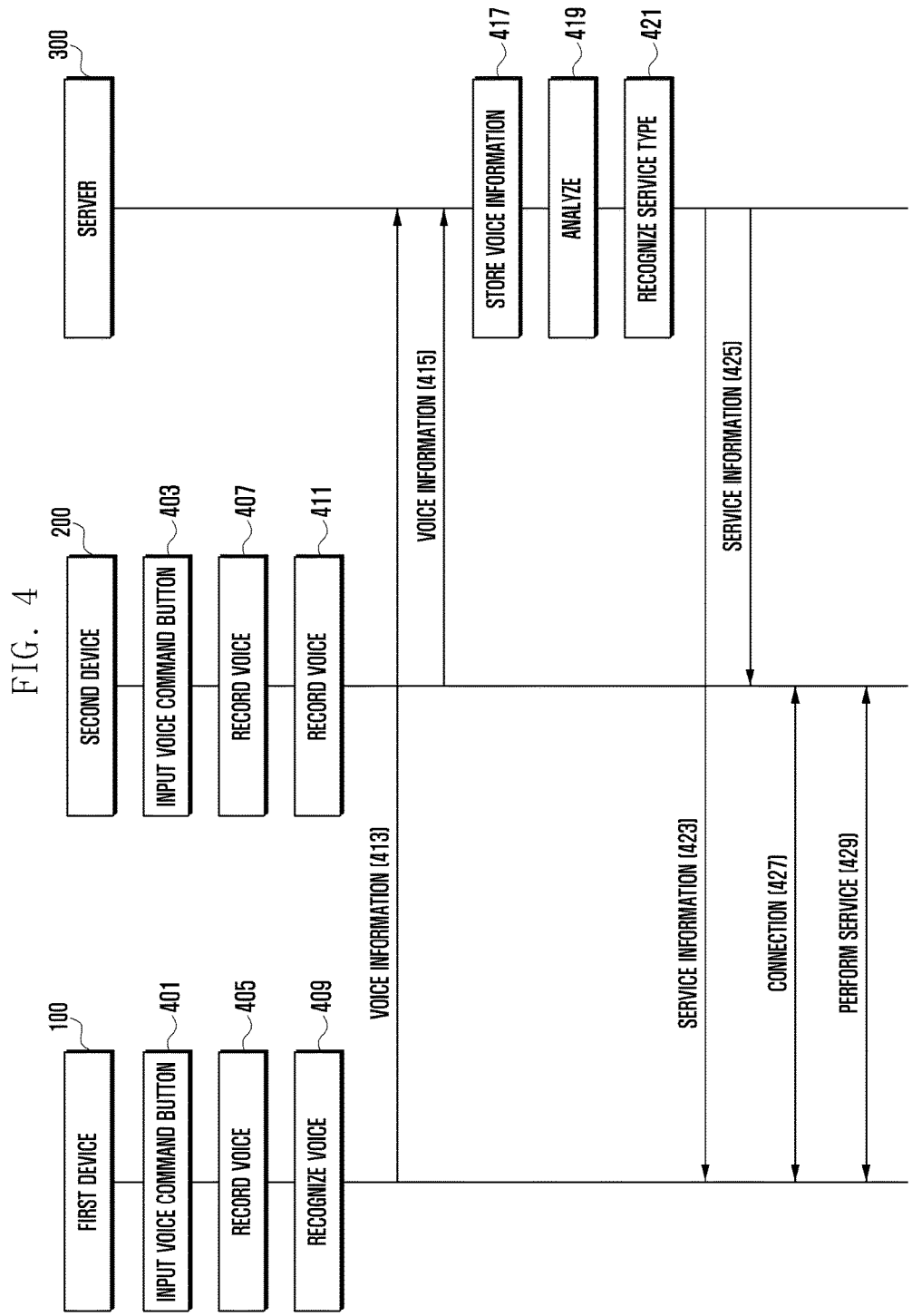
FIG. 4 is a signal flowchart illustrating a process of a service connection between user devices according to an embodiment of the present invention.

FIG. 4 is a signal flowchart illustrating a process of a service connection between user devices according to an embodiment of the present invention, and FIG. 5 is a diagram illustrating an example where voice information used in a service connection of user devices is stored according to an embodiment of the present invention.

Referring to FIG. 4, if a voice command button 150 input is received, in steps 401 and 403, the first device 100 and the second device 200 respectively record the user voice input through the microphone 243, in steps 405 and 407. For example, the user may input (e.g., speak) a start command (e.g., "connect device") for establishing a connection between devices or a service command (e.g., "connect device transmit file", "connect device share address list", etc.) while pushing the voice command button 150 provided in the first device 100 and the second device 200, and may cancel the input of the voice command button 150.

When the input of the voice command button 150 is canceled, the first device 100 and the second device 200 perform voice recognition on the recorded voice, at steps 409 and 411. The first device 100 and the second device 200 determine whether a start command (e.g., "device connection") for establishing a service connection between devices is detected through the analysis of the recorded voice.

When the start command for service connection is detected, the first device 100 and the second device 200 generate voice information sets and respectively transmit the generated voice information sets to the server 300, in steps 413 and 415. According to embodiments of the present invention, voice information may include recording data of the user's voice and the related information that is needed for service connection between user devices. For example, the voice information may include the recording data voice waveform), a timestamp and a device identifier, etc.

When voice information is received from the first device 100 and the second device 200, the server 300 divides the received voice information according to device, and stores the divided voice information in the database, in step 417. Further, the server 300 performs analysis on the voice information stored in the database, in step 419.

For example, when the voice information is received, the server 300 checks whether there is voice information corresponding to the received voice information in the database. For example, as illustrated in FIG. 5, the server 300 may divide or categorize the received voice information by device, and store device information, recording data (e.g., a voice waveform), timestamp, connection information (e.g., a device address) and raw data, etc. Further, the server 300 may search for voice information that coincides with the stored voice information as in FIG. 5. For example, the server 300 may detect voice waveforms which are determined as the same as the recording data of the received voice information, and determine whether the detected voice waveforms have been generated in the same time zone (e.g., with a delay less than a threshold) by checking the timestamps of the detected waveforms. Further, when the same voice waveform and the same time zone are checked, the server 300 determines that the devices are trying to establish a connection with each other. For example, the server 300 may determine that voice information corresponding to device B and device E in FIG. 5 have the same voice information.

At this time, the server 300 processes voice information analysis according to the order in which the voice information has been received. For example, when the voice information by the first device 100 is received ahead of the second device 200, the analysis is performed on the basis of the voice information received from the second device 100. Further, if the detected voice information corresponding to the voice information received from the first device 100 is the voice information of the second device 200, the timestamp of the voice information received from the second device 200 is checked, and if the timestamp belongs to a same time zone (e.g., within a time period of a certain length), the analysis on the voice information received from the second device 200 may be omitted.

The server 300 recognizes a connection method to be performed amongst the devices (e.g., the first device 100 and the second device 200) where coinciding sound information has been provided through the analysis on the voice information, and the service type, in step 421. For example, when at least two devices having mutually coinciding voice information are determined to exist, the server 300 checks the timestamp of each device and recognizes the mode at which each device is to be performed according to the difference of the time recorded in the timestamp, and recognizes the service intended to be performed by analyzing the voice command from the recording data. More specifically, the server 300 recognizes which service connection is to be connected between devices through the process of analyzing the recognized voice command (e.g., "connect device", "connect device transmit file", etc.).

The server 300 may generate service information according to the service type for each respective device (e.g., the first device 100 and the second device 200), and respectively transmits the corresponding service information to the first device 100 and the second device 200, in steps 423 and 425. For example, the server 300 may respectively generate service information to be transmitted to each device (the first device 100 and the second device 200) using the service type, connection information and execution information for each device, and may respectively transmit the generated service information to the first device 100 and the second device 200. The service information may include the service type, connection information and execution information for each device, and the execution information may be selectively included according to the analyzed voice command type. For example, if the voice command includes only the service start command ("connect device") as in "connect device", the execution information may be omitted, and when the voice command includes the service start command ("connect device") and the service command ("transmit file") as in "connect device transmit file", the execution information direction file transmission may be included.

When service information on the transmission of voice information from the server 300 is received, the first device 100 and the second device 200 perform a connection that has been mutually determined according to the received service information, in step 427. For example, the first device 100 and the second device 200 may determine the mode to be operated according to the service information (for example, the service type) and determine the information of the device to be connected according to the service information (for example, connection information). Further, the device operating in master mode from among the first device 100 and the second device 200 attempts to connect with a device corresponding to service information (particularly, connection information) according to a preset connection scheme (e.g., a Bluetooth connection, wireless LAN connection, WiFi direct connection, etc.).

The first device 100 and the second device 200 perform a service according to service information when mutually connected, in step 429. For example, when a mutual connection is completed, a service corresponding to the device of slave mode to which the device of master mode has been connected and service information (particularly, execution information) may be executed.

For example, when the first device 100 operates in a master mode and the second device 200 operates in a slave mode, if execution information corresponds to <transmit file>, the file currently selected (or displayed) in the first device 100 may be transmitted to the second device 200. Further, if the execution information corresponds to <share address list>, the address list information of the first device 100 may be transmitted to the second device 200. Here, when sharing the address list, the address list of the second device 200 may be synchronized with the address list of the first device 100, or the address list of the first device 100 may be added to the address list of the second device 200. Further, if the execution information corresponds to <connect game>, the network game connection between the first device 100 and the second device 200 may be performed. Further, if the execution information corresponds to <execute speaker>, the first device 100 may be in charge of outputting the left sound of the surround speaker, and the second device 200 may be in charge of the right sound of the surround speaker. Further, if the execution information corresponds to <connect keyboard>, the second device 200 may operate as a virtual keyboard or a virtual mouse so that the second device 200 may operate as an input means of the first device 100.

Further, as described above, if execution information is not included in the service information, step S429 of executing a service between the first device 100 and the second device 200 may be omitted.

Figure 6:
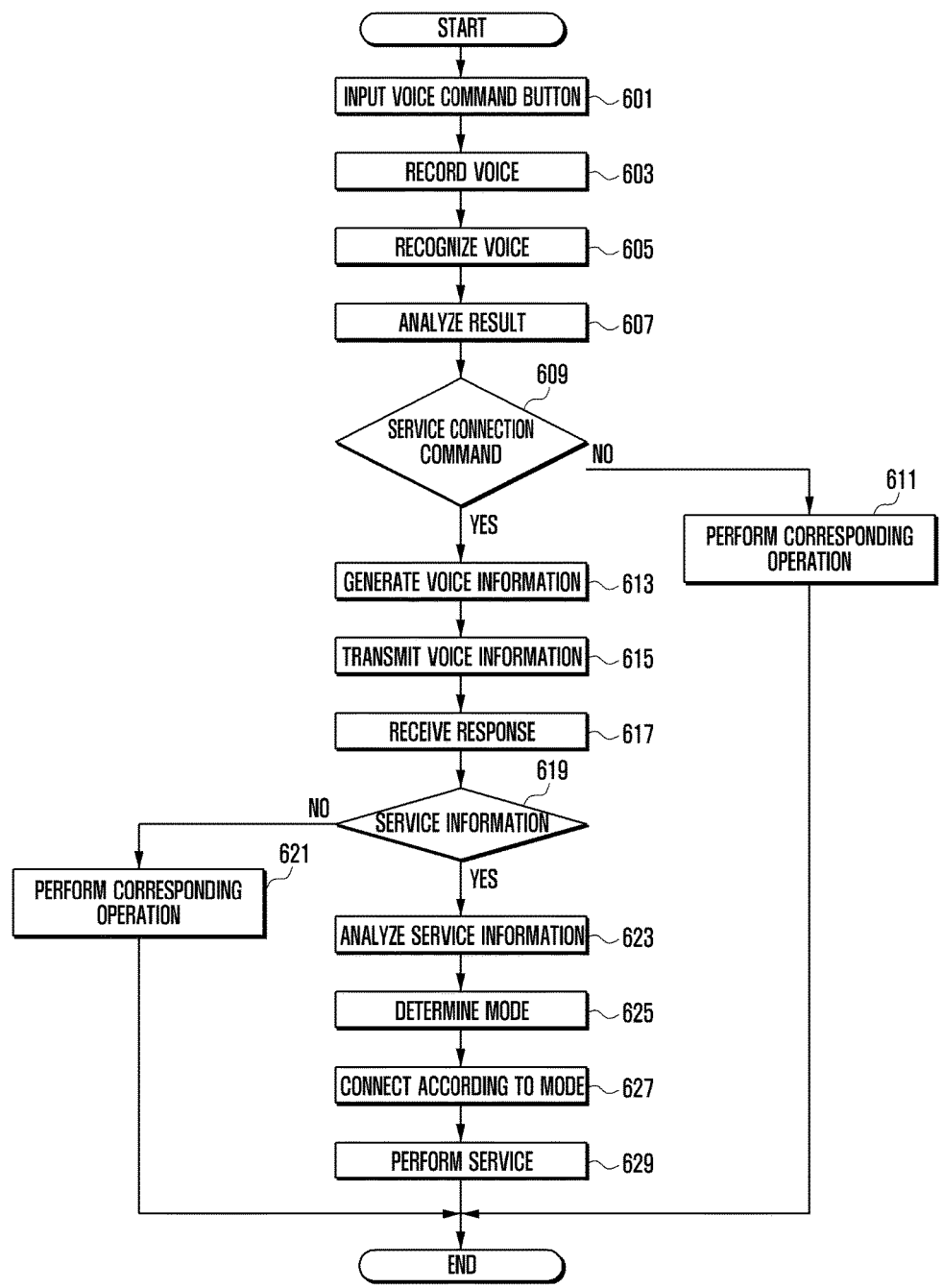
FIG. 6 is a flowchart illustrating a process of a service connection based on a user voice in a user device according to an embodiment of the present invention.

FIG. 6 is a flowchart illustrating a process of establishing a service connection based on a user voice in a user device according to an embodiment of the present invention.

Referring to FIG. 6, when a voice command button 150 is received in step 601, a controller 270 records a user voice input through the microphone 243, in step 603. At this time, when an input (e.g. actuation) of the voice command button 150 is detected, the controller 270 checks the state of the microphone 243, and if in a deactivated state, the controller 270 activates the microphone 243. Further, the controller 270 may control a display of a guide screen for guiding a user's voice input through the display unit 230.

When sensing a cancellation of an input of the voice command button 150, the controller 270 performs recognition on the recorded user voice, in step 605, and analyzes the result of the voice recognition, in step 607. Further, the controller 270 determines whether the user voice corresponds to a command for service connection through the recognition performed on the recorded user voice, in step 609. More specifically, the controller 270 determines whether a start command (e.g., "connect device") for establishing a service connection between devices has been detected through voice recognition.

If a start command for service connection is not detected ("NO" in step 609), the controller 270 may control performance of the operation, in step 611. For example, the controller 270 may perform a search of a user's input internal data (or content, etc.), or perform a search of a market (or a general Internet search).

If a start command for establishing a service connection is detected ("YES" in step 609), the controller 270 generates voice information in step 613, and transmits the generated voice information to an already promised server 300, in step 615. For example, the controller 270 may generate voice information including recording data of a user voice needed for service connection between devices, time information (timestamp) relating to the time the voice command button 150 was inputted, and the device identifier (device address), and transmit the generated voice information to the server 300.

After transmitting the voice information, if a response to the voice information is received from the server 300, in step 617, the controller 270 determines whether the response from the server 300 corresponds to the service information, in step 619. If the response of the server 300 is not service information ("NO" in step 619), the controller 270 controls performance of the operation, in step 621. For example, if the response received from the server 300 corresponds to error information, but not service information, the controller 270 controls the output of error information. Further, after error information as output, the controller 270 re-performs a service connection procedure in response to an input from user, or may terminate the service connection procedure.

If the response of the server 300 corresponds to the service information ("YES" in step 619), the controller 270 analyzes the received service information, in step 623. For example, the controller 270 may determine the service type, the device of the object to be connected, and the execution service with the connected it) device from the received service information.

The controller 270 determines the mode (i.e., master mode or slave mode) according to the service information, in step 625, and performs a connection with a device to be connected using a set communication method according to the determined mode, in step 627. For example, the controller 270 determines one operation mode among the master mode and the slave mode according to service information, transmits a connection request to a device to be connected in the determined operation mode, receives a connection request from the device to be connected, and performs a connection accordingly.

When connected with the device to be connected, the controller 270 performs a service corresponding to the device and service information, in step 629. For example, as described above, the controller 270 performs a service corresponding to execution information at master mode or may perform a service corresponding to the execution information at slave mode.

Figure 7:
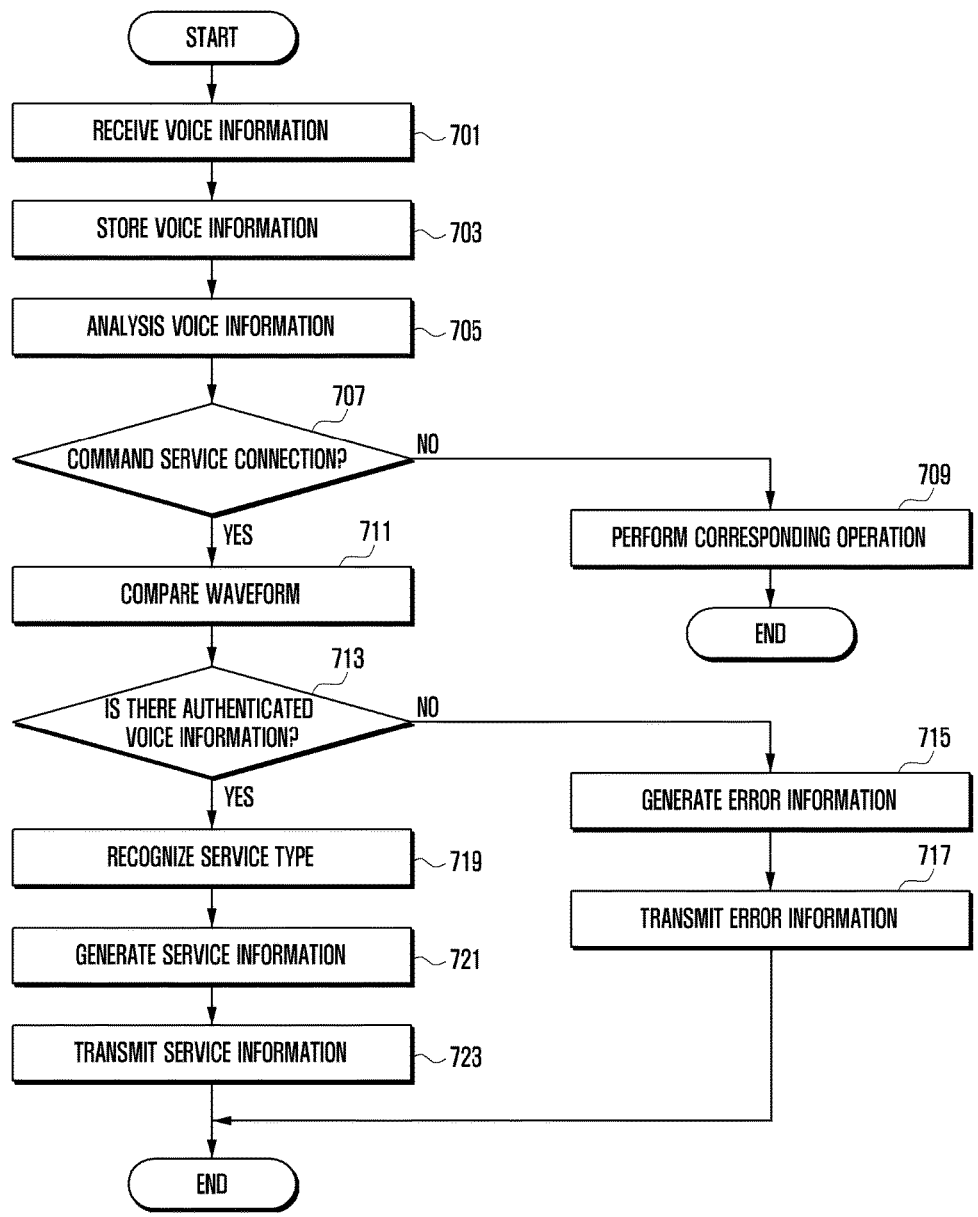
FIG. 7 is a flowchart illustrating a process of authenticating user devices in a server according to an embodiment of the present invention.

FIG. 7 is a flowchart illustrating a process of authenticating user devices in a server 300 according to an embodiment of the present invention.

Referring to FIG. 7, if voice information is received from a certain device, in step 701, the server 300 stores the received voice information, in step 703, and performs an analysis on the voice information, in step 705. At this time, the server 300 divides or categorizes the received information according to device, and stores the divided or categorized information in the database.

The server 300 determines whether the voice corresponds to the service connection command through the analysis on the voice information, in step 707. For example, the server 300 determines whether the received voice information includes a predefined command such as a start command (e.g., "connect device") for establishing a service connection between devices.

If the received voice information does not include a service connection command ("NO" at step 707), the server 300 processes performance of the operation, in step 709. For example, the server 300 determines that the received voice information corresponds to a general voice search word and performs a search of the database according to the search word.

When the received voice information includes a service connection command ("YES" at step 707), the server 300 performs a comparison and search to determine whether the voice information corresponding to the received voice information exists in the database, in step 711. Based on the results of the search and comparison, the server 300 determines whether there is another set of voice information (hereinafter, referred to as "authenticated voice information") corresponding to the received voice information through a voice waveform comparison included in the voice information, in step 713. More specifically, the server 300 searches for another set of voice information having a voice waveform a that coincides or matches with the recording data of the voice information, and performs a comparison and analysis to determine whether voice information sets were generated during the same time zone or period by checking the timestamp of the searched voice information.

When authenticated voice information corresponding to the received voice information does not exist ("NO" in step 713), the server 300 generates error information in step 715, and transmits error information to the device having transmitted the voice information, in step 717. For example, when the server 300 does not have a device to be connected for the service connection request, the server 300 transmits error information indicating termination of the service connection procedure to the device.

If authenticated voice information corresponding to the received voice information exists ("YES" in step 713), the server 300 determines what devices are attempting connection and recognizes the service type using the received voice information and the authenticated voice information, in step 719. For example, the server 300 may determine the operation mode (i.e., master mode or slave mode) for devices according to the difference or order of the times when the timestamps were recorded by checking each timestamp. The server 300 may determine inter-device connection and execution service thereof by checking the command that has been obtained from recording data of the voice information.

The server 300 generates service information by at least two devices according to the recognized service type, in step 721. Further, the server 300 divides service information according to each respective device, in step 723. For example, the server 300 may generate service information to be transmitted to each device using the service type, connection information and execution information for each device, and may individually transmit the generated service information to the corresponding respective devices. For example, when a service connection is requested from two devices (e.g., the first device 100 and the second device 200) by the received voice information and authentication voice information, the server 300 respectively generates the first service information to be transmitted to the first device 100 and the second device information to be transmitted to the second device 200. Further, the server 300 transmits the first service information to the first device 100 and transmits the second service information to the second device 200.

Figure 8:
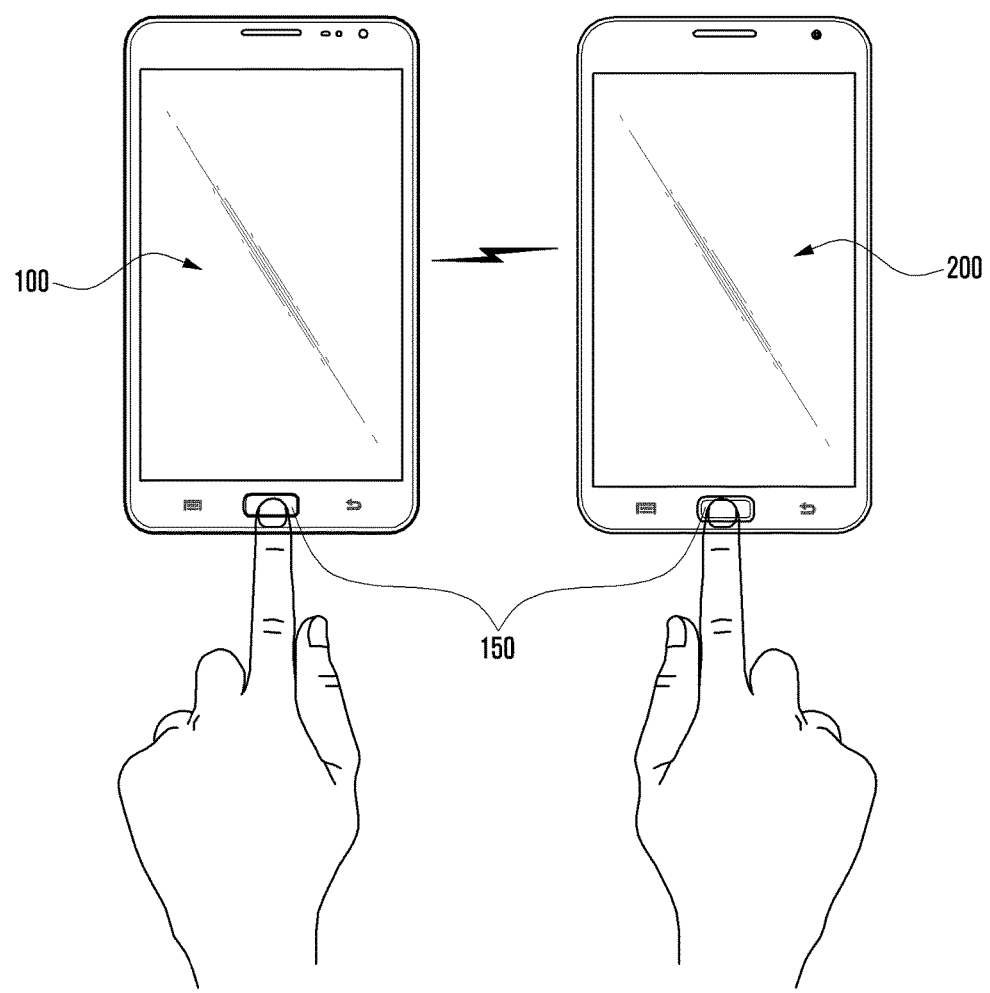
FIG. 8 schematically illustrates a concept of connecting a service between user devices according to an embodiment of the present invention.

FIG. 8 schematically illustrates a technique for connecting a service between user devices according to an embodiment of the present invention.

As illustrated in the above FIG. 1, a system for service connection based on a user voice of the present invention may include a first user device 100 and a second user device 200. Unlike the system configuration of FIG. 1, FIG. 8 illustrates an example according to a system without configuration performed by the server 300. Further, although FIG. 8 illustrates a service connection operation using two user devices 100 and 200, embodiments of the present invention are not limited thereto. For example, a service connection for two or more devices is possible in accordance with embodiments of the present invention. The first user device 100 and the second user device 200 perform a function and operation as described with reference to FIGS. 1 to 7. However, in a system environment as in FIG. 8, in the first user device 100 and the second user device 200, the functions and operations performed with the server are omitted, and authentication of the user voice without the server 300 is additionally performed.

Referring to FIG. 8, FIG. 8 illustrates an operation where the first user device 100 is connected with the second device 200 using wireless LAN. Further, in the present example, the first user device 100 operates in master mode (i.e., AP) or the second user device 200 operates at slave mode (i.e., Non-AP). More specifically, in the present example, the voice command button 150 of the first user device 100 is input earlier than the voice command button 150 of the second user device 200, and thereby the timestamps of the first and second user devices 100 and 200 are not the same.

The first user device 100 and the second user device 200 include a voice command button 150 of a hardware or software interface type that waits for reception of a voice input from user to perform a voice-based service connection. The first user device 100 and the second user device 200 record timestamp when a voice command button 150 is input, and record a user voice input in a state where the voice command button 150 is pushed. Further, when an input on the voice command button 150 is canceled, the first user device 100 and the second user device 200 perform voice recognition on the recorded voice (i.e., recording data).

When a command for establishing a connection between user devices is detected as a result of voice recognition, the first user device 100 and the second user device 200 load voice information including recording data and output the voice information through the speaker 241. For example, the sound containing first voice information generated in the first user device 100 may be transmitted to an adjacent second user device 200, and the second user device 200 may receive sounds outputted from the first user device 100 through the microphone 243, in addition to, or as an alternative, the sound containing the second voice information generated in the second user device 200 may be transmitted to an adjacent or nearby first user device 100 (e.g., a device that is within a certain distance capable of detecting the sound), and the first user device 100 may receive the sound outputted from the second user device 200 through the microphone 243. According to embodiments of the present invention, the sound includes sound waves of audible frequencies and/or non-audible frequencies, and is referred to generally as "sound". At this time, the first user device 100 and the second user device 200 encode recording data and convert the encoded recording data into sounds (i.e., sound waves) of audio frequencies or more than audible frequencies so as to be outputted through the speaker 241. At this time, the voice information includes the timestamp, device address, etc. as well as recording data of the user voice.

The first user device 100 and the second user device 200 output sounds through the speaker 241, and receive sounds output from another user device through the microphone 243 of the first user device 100 and the second user device 200. Then the first user device 100 and the second user device 200 execute a service by performing a mutual connection using voice information input through the microphone 243 and transmitted voice information.

At this time, the first user device 100 and the second user device 200 determine whether the input voice information corresponds to voice information for service connection by authenticating the input voice information. For example, the first user device 100 and the second user device 200 process authentication of input voice information through comparison and analysis for determining whether the input voice information includes timestamp or the recording data of the input voice information coincides or matches with the recording data of the transmitted voice information.

When the input voice information corresponds to the authenticated voice information for service connection, the first user device 100 and the second user device 200 may determine the operation mode, determine the device to be connected and determine the execution service by analyzing the voice information. For example, the first user device 100 and the second user device 200 compare respective timestamps of voice information sets and determine master mode or slave mode according to the recording time difference or order, determine the device to be connected through the device address, and determine an execution service based on the command according to the voice recognition.

The first user device 100 and the second user device 200 perform a connection using a preset communication scheme in an operation mode determined according to the analyzed voice information, and perform a service corresponding to a command at an operation mode determined when mutually connected. For example, the first user device 100 and the second user device 200 may form a wireless LAN link, and when a mutual connection is completed, the user device determined as master may transmit a currently displayed image file to the opponent user device. Further, the user device determined as master may operate as a left speaker, and the user device determined as slave may operate as a right speaker so that audios of a media file replayed in the master device may be respectively output. Further, the user device determined as master may operate as an input means and the user device determined as slave may operate as a display means so that information input by the user device of master may be displayed through the user device operating as a slave. Further, the data displayed in the user device determined as master may be transmitted to the user device determined as slave, and the data displayed in the user device may be displayed together with the user device of slave.

Figure 9:
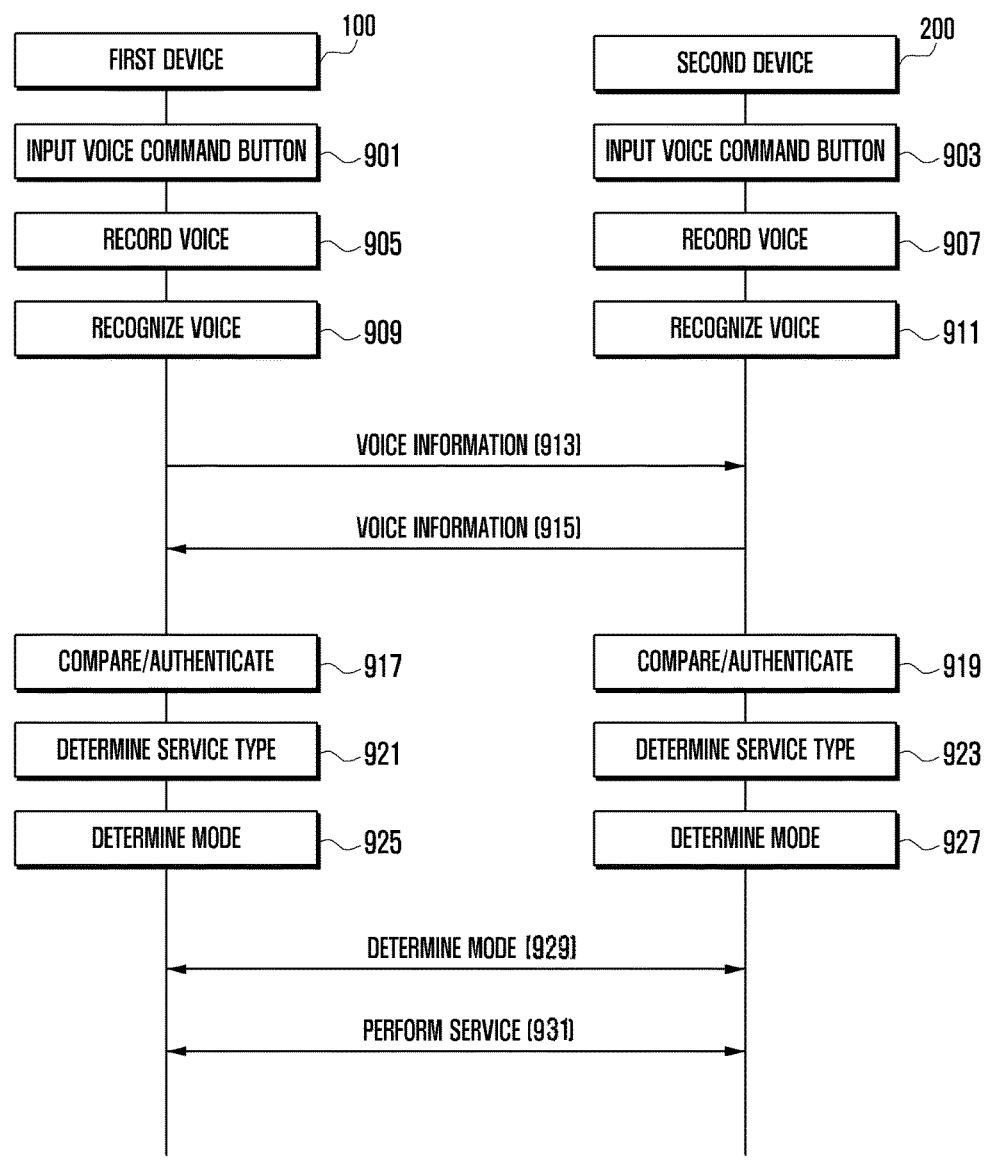
FIG. 9 is a signal flowchart illustrating a process of a service connection between user devices according to an embodiment of the present invention.

FIG. 9 is a signal flowchart illustrating a process of a service connection between user devices according to an embodiment of the present invention. In Hi particular, FIG. 9 illustrates an operation of supporting a direct connection between user devices without the server 300 as illustrated above.

Referring to FIG. 9, if an input of a voice command button 150 is received, in steps 901 and 903, the first device 100 and the second device 200 respectively record user voice input through the microphone 243, in steps 905 and 907. For example, in a state where the voice command button 150 included in the first device 100 and the second device 200 is pushed, user inputs (i.e., speaks) a start command (e.g., "connect device") for establishing a connection between devices or a service command (e.g., "connect device transmit file", "connect device share address list", etc.) for device connection and execution, and cancels the input of the voice command button 150.

When the input of the voice command button 150 is canceled, the first device 100 and the second device 200 perform voice recognition for the recorded voice, in steps 909 and 911. The first device and the second device 200 may determine whether a start command (e.g., "connect device") for service connection between devices is detected through the analysis of the recorded voice.

When a start command for service connection is detected, the first device 100 and the second device 200 generate voice information sets and respectively output the voice information sets through the speakers 241 included in the first device 100 and the second device 200, in steps 913 and 915. For example, the first device 100 and the second device 200 may load generated voice information in sounds, and may output the sounds to an adjacent opponent device through each speaker. According to another example, the sound containing the first voice information generated in the first device 100 may be transmitted to the adjacent second user device 200 through the speaker 241, and the second user device 200 may receive sounds outputted from the first user device 100 through the microphone 243. As an alternative, the sounds containing the second voice information generated in the second user device 200 may be transmitted to the adjacent first user device 100 through the speaker 241, and the first user device 100 may receive sounds output from the second user device 200 through the microphone 243.

After outputting sounds through the speaker 241, when voice information outputted from an adjacent device is input through the microphone 243, the first device 100 and the second device 200 compare voice information input through the microphone 243 and the voice information transmitted through the speaker 241 for authentication, in steps 917 and 919. More specifically, the first device 100 and the second device 200 may determine whether voice information input through respective microphones 243 corresponds to voice information for service connection by authenticating the input voice information. For example, the first device 100 and the second device 200 may perform authentication by performing comparison and analysis on whether input voice information includes timestamp or whether recording data of the input voice information coincides with recording data of the transmitted voice information.

When the input voice information for service connection is successfully authenticated, the first device 100 and the second device 200 determine the service type, in steps 921 and 923. For example, the first device 100 and the second device 200 may check the operation mode, check a device to be connected, and check a type of an execution service at the time of connection by referring to the input voice information and the transmitted voice information. Further, the first device 100 and the second device 200 determine the operation mode thereof according to the determination of the service type, in steps 925 and 927, and attempt connection according to the device to be connected or a predetermined connection scheme at each determined operation mode.

When the first device 100 and the second device 200 are connected in step 929, the first device 100 and the second device 200 perform a service corresponding to voice information at each operation mode, in step 931. For example, when mutual connection between the first device 100 and the second device 200 is completed, the first device 100 and the second device 200 perform a service corresponding to voice information with the device operating in slave mode to which the device operating in master mode is connected. For example, assuming that the first device 100 operates in master mode and the second device 200 operates in slave mode, the file currently selected (or displayed) in the first device 100 may be transmitted to the second device 200, the address information of the first device 100 may be transmitted to the second device 200, the first device may be configured to perform output of the left sound of the surround speaker or the second device 200 may be configured to perform output of the right sound of the surround speaker, or the second device 200 may operate as a virtual keyboard or a virtual mouse so that the second device may operate as an input means of the first device 100.

Further, as described above, when the voice information does not include a service command to be executed and includes only a start command for connection between devices, step S931 of executing a service between the first device 100 and the second device 200 are omitted.

Figure 10:
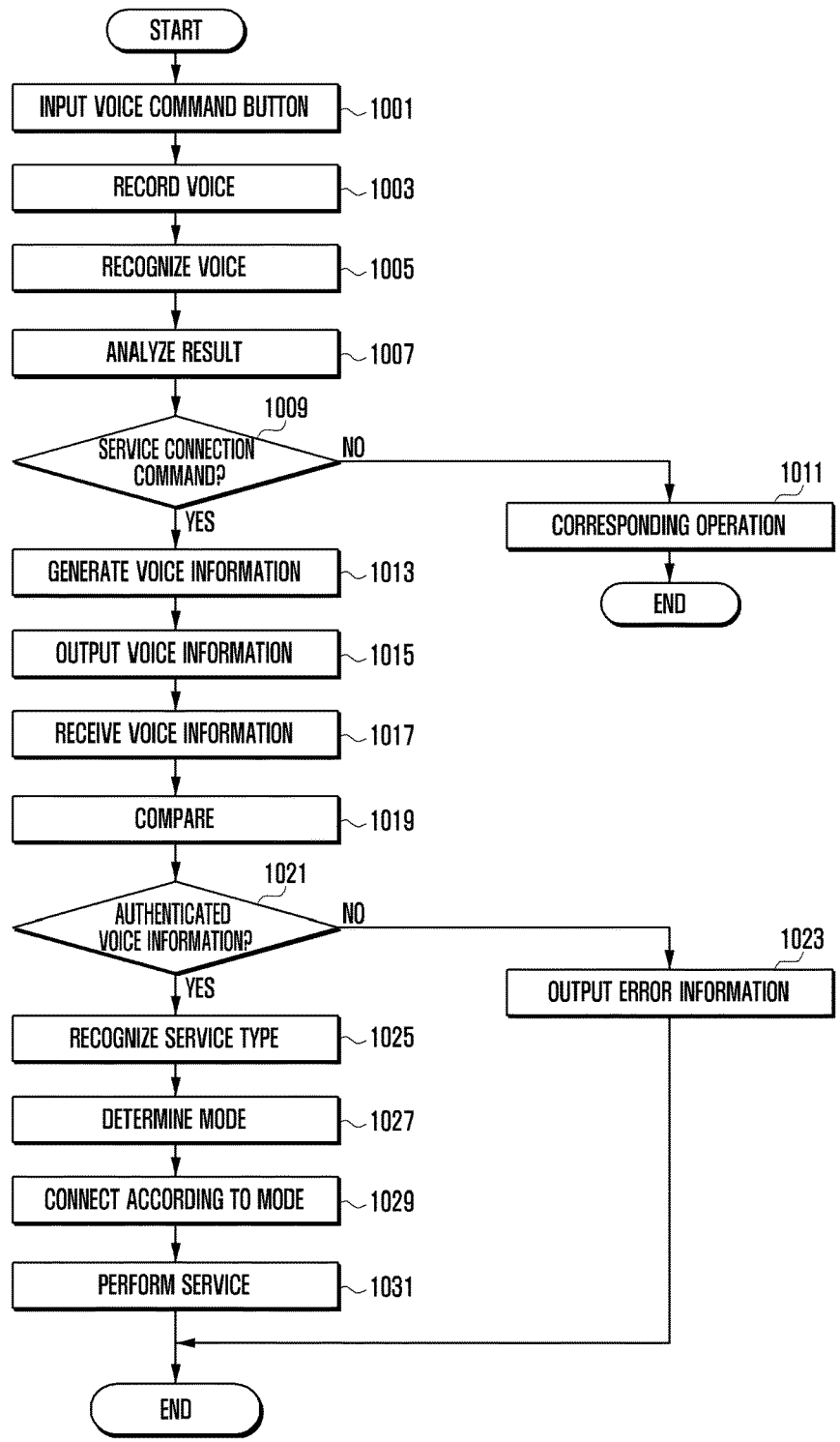
FIG. 10. is a flowchart illustrating a service connection based on a user voice in a user device according to an embodiment of the present invention.

FIG. 10 is a flowchart illustrating a service connection based on a user voice in a user device according to an embodiment of the present invention.

Referring to FIG. 10, if a voice command button 150 is received in step 1001, the controller 270 records a user voice input through the microphone 243, in step 1003. At this time, when an input of the voice command button 150 is detected, the controller 270 checks the state of the microphone 243 and controls a turn-on of the microphone 243 if the microphone 243 is in a deactivated state. Further, the controller 270 may control a display of a guide screen that guides a user's voice input through the display unit 230.

When a cancellation of an input of a voice command button 150 is sensed, the controller 270 performs recognition on the recorded user voice in step 1005 and analyzes the recognition result according to the voice recognition, in step 1007. Further, the controller 270 determines whether the user voice corresponds to a command for service connection through the recognition of the recorded user voice, in step 1009. More specifically, the controller 270 determines whether a start command (e.g., "connect device") for service connection between devices is detected through voice recognition.

If a start command for service connection is not detected ("NO" in 1009), the controller 270 controls performance of the operation, in step 1011. For example, the controller 270 performs a search of internal data (or contents, etc.) for an input voice command of user, or a market (or Internet) search.

If a start command for service connection is detected ("YES" in step 1009), the controller 270 generates voice information in step 1013 and loads the generated voice information in sounds and output the sounds through the speaker 241, in step 1015. For example, the controller 270 may convert voice information including recording data of a user voice needed for service connection between devices, time information (i.e., a timestamp) relating to the time at which the voice command button 150 has been input, and the device address for device identification, etc. into sound waves (i.e., sounds) of a certain frequency hand so as to output the converted sound waves through the speaker 241.

After transmitting voice information, the controller 270 receives next voice information through the microphone 243, in step 1017. More specifically, the controller 270 receives sounds containing voice information output from another device through the microphone 243 after voice information is transmitted. Then the controller 270 obtains voice information by parsing the received sounds. If a voice command is not included or detected in the received sounds, the controller 270 disregards the received sounds. More specifically, sounds without a voice command are considered as noise, and an input thereof is disregarded.

The controller 270 compares voice information input through the microphone 243 with voice information output through the speaker 241, in step 1019, and determines whether the input voice information corresponds to the authenticated voice information, in step 1021. For example, the controller 270 may perform authentication of voice information input through comparison and analysis on whether the input voice information includes a coinciding or matching timestamp or whether the recording data of the input voice information coincides with or matches the recording data of the outputted voice information.

If the input voice information is not authenticated voice information for a service connection ("NO" in step 1021), the controller 270 outputs error information, in step 1023. For example, if input voice information is not voice information for service connection, the controller 270 may output error information informing user of the fact that service connection is not possible.

If the input voice information is authenticated voice information for service connection ("YES" in step 1021), the controller 270 recognizes the service type by referring to the input voice information and the output voice information, in step 1025. For example, the controller 270 determines the operation mode according to the time difference between, or order of, timestamps, the device to be connected, and a service to be executed with the connected device from voice information sets.

The controller 270 determines the operation mode according to voice information sets, in step 1027, and performs a connection with a device to be connected in a predetermined communication scheme according to a determined operation mode, in step 1029. For example, the controller 270 determines one of operations modes among master mode and slave mode according to voice information sets, transmits a connection request to a device to be connected according to the determined operation mode, and receives the connection request from the device to be connected and perform the connection accordingly.

When connected with the device to be connected, the controller 270 performs a service with the connected device in the determined operation mode, in step 1031. For example, the controller 270 may perform a service at master mode or perform service at slave mode as described herein above.

Figure 11:
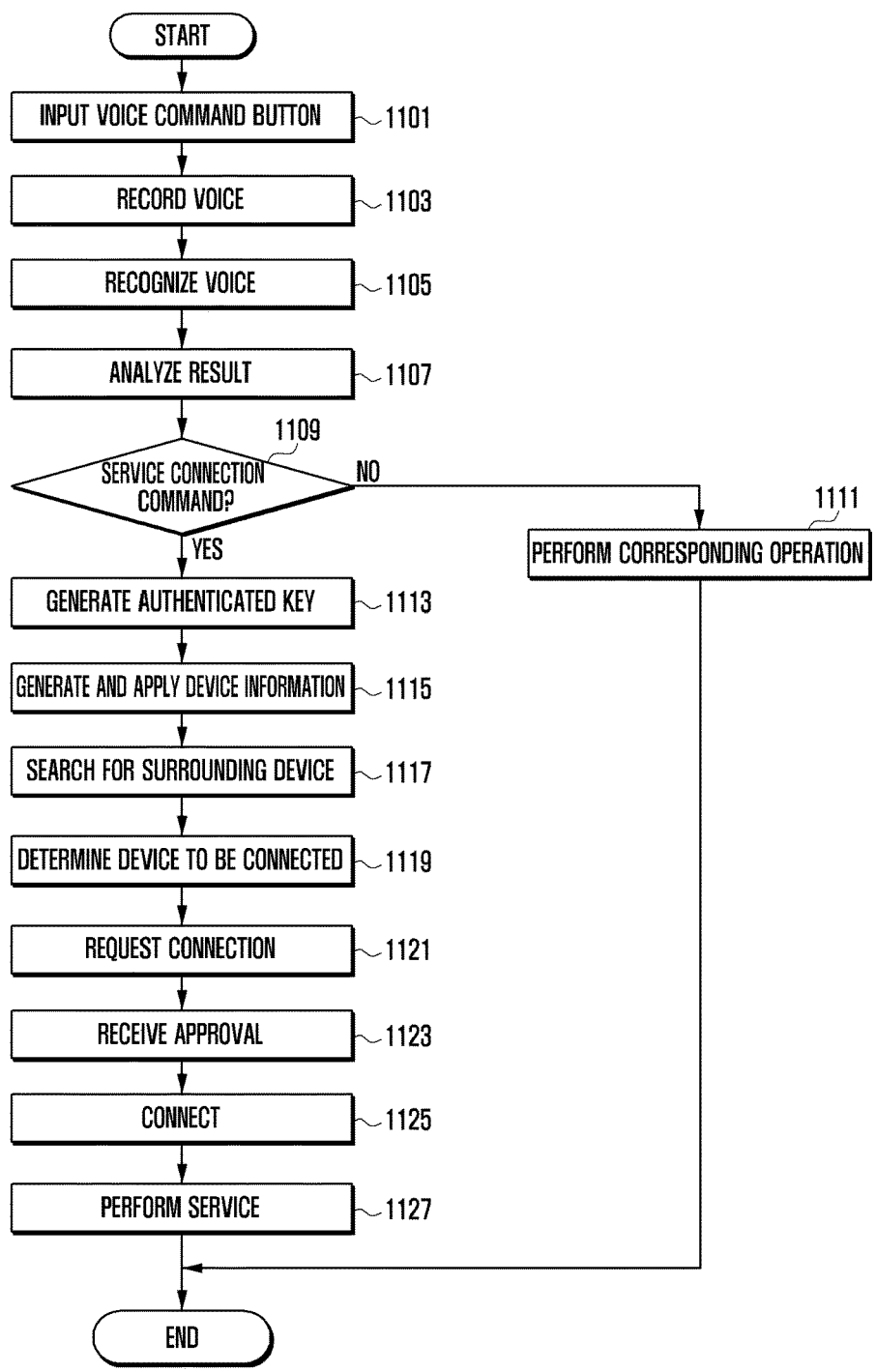
FIGS. 11 and 12 are flowcharts illustrating a process of processing a service connection based on a user voice in a user device according to an embodiment of the present invention.

FIG. 11 is a flowchart illustrating a process of processing a service connection based on a user voice in a user device according to an embodiment of the present invention.

FIG. 11 shows another operation example that supports a direction connection between user devices without a server 300 as described above, in the present example, user devices for performing a service connection include a first device and a second device, the first device is a device that requests a device connection to the second device according to a predetermined communication scheme (e.g., WiFi Direct or Bluetooth), and the second device is a device that receives a device connection request from the first device, FIG. 11 shows an operation of processing a service connection based on a user voice in the first device.

Referring to FIG. 11, if an input of a voice command button 150 is received, in step 1101, the controller 270 records a user voice input through the microphone 243, in step 1103. At this time, the controller 270 records time information (i.e., a timestamp) when detecting an input of a voice command button 150. Further, when detecting the input of the voice command button 150, the controller 270 checks the state of the microphone 243 and turns on the microphone if the microphone is in a deactivated state. Further, the controller 270 may control a display of a guide screen that guides an input of a user's voice through the display unit 230.

When sensing cancellation of an input of the voice command button 150, the controller 270 performs recognition on the recorded user voice in step 1105 and analyzes a result according to the voice recognition, in step 1107. Further, the controller 270 determines whether the user voice corresponds to a command for service connection through recognition of the recorded user voice, in step 1109. More specifically, the controller 270 determines whether a start command (e "connect device") for establishing a service connection between devices is detected through voice recognition.

If a start command for establishing a service connection is not detected ("NO: in step 1109), the controller 270 controls performance of a corresponding operation, in step 1111. For example, the controller 270 may perform a search of internal data (or contents) for the input user's voice command, or perform a market search (or a general Internet search).

If a start comment for service connection k detected ("YES" in step 1109), the controller 270 generates an authentication key, in step 1113. For example, if a device connection is determined according to a start command for establishing service connection, a voice waveform may be extracted from recording data of a user voice that is input through the microphone 243 and is recorded, and may check the input time information (i.e., a timestamp). Further, the controller 270 may generate an authentication key value by using the voice waveform and time information.

In one example according to an embodiment of the present invention, the authentication value is generated as a unique character (e.g., a unique, letter, number, or alphanumeric character) string by utilizing features of the recorded voice waveform information and time information timestamp). For example, the generated authentication key value may be generated as a random number, such as "24125829252572257239529", and may be configured from a table of random numbers to which random numbers are mapped. The authentication key value may be divided into a portion indicating the voice waveform and a portion indicating time information. For example, the authentication key value having a string such as "24125829252572257239529" may be divided into a string of a voice waveform portion such as "24125829525722" and a string of a time information portion such as "57239529".

At this time, the authentication key value, the length of the voice waveform portion, and time information portion may be defined in advance. Further, in the authentication key generated in the first device and the second device, the string of the voice waveform portion may have the same value, and the string of the time information portion may have different values according to the timestamp of the first device and the second device. More specifically, the key values may be generated with different values according to the time difference according to the recording time, and may then be included in the authentication key.

When an authentication key is generated, the controller 270 generates the authentication key as device information (e.g., a device identifier) used for device identification at the time of inter-device connection and the authentication key is then applied, in step 1115. At this time, when generating the authentication key, the controller 270 controls activation of a communication mode (i.e., a function) for checking a predetermined communication scheme and supporting the checked communication scheme, in step 1113. For example, the controller 270 may control activation of the communication mode by turning on the wireless LAN module 213 or the short range communication module 215 (e.g., a Bluetooth module). Further, the controller 270 may change the device identifier to be used in the activated communication mode to device information based on the authentication key.

The controller 270 controls a search for a surrounding device according to the communication scheme after setting device information based on the authentication key, in step 1117. For example, the controller 270 may search for a surrounding device to connect with via a WiFi direct connection using wireless LAN module 213 and a search for a surrounding device for short range communication (e.g., Bluetooth communication) using the short range module 215.

The controller 270 determines a device to be connected for service connection among devices searched according to the search of the surrounding device, in step 1119. In particular, the controller 270 detects a device having device information corresponding to the previously-generated authentication key among the searched connectable devices, and determines the detected device having the corresponding authentication key as a device to be connected. At this time, the controller 270 may search for device information of a string coinciding with or matching the string of the user voice waveform portion from the authentication key. More specifically, the string of the time information portion in the authentication key may have a difference in the timestamp according to time that inputs the voice command button 150 in each device, and thus the time information portion may not coincide, and accordingly, the device determines whether the time waveform portion coincides.

When determining the device to be connected, the controller 270 transmits a device connection request to the device to be connected, in step 1121. At this time, the controller 270 may transmit a request such as a WiFi direct connection request or a Bluetooth connection request according to the determined communication scheme.

After transmitting the connection request, when a connection approval for the connection request is received from the device to be connected in step 1123, the controller 270 performs the connection between the device to be connected and the device of the communication scheme, in step 1125.

The controller 270 performs a service upon connecting with the device to be connected, in step 1127. For example, after connecting to the device to be connected, the controller 270 may transmit data according to user's request to the device to be connected, or may receive data transmitted from the device to be connected.

Further, as considered above, if the service command is detected through the voice recognition, the service according to the service command may be automatically performed. The controller 270 determines whether to operate in either of a master mode or slave mode at the time of automatic service performance, and performs a service in the determined master mode or slave mode. At this time, the controller 270 compares the authentication key with the string of the time information portion in the device information of the device to be connected to check the time difference, and determines whether to operate in master mode or slave mode according to the checked time difference.

Figure 12:
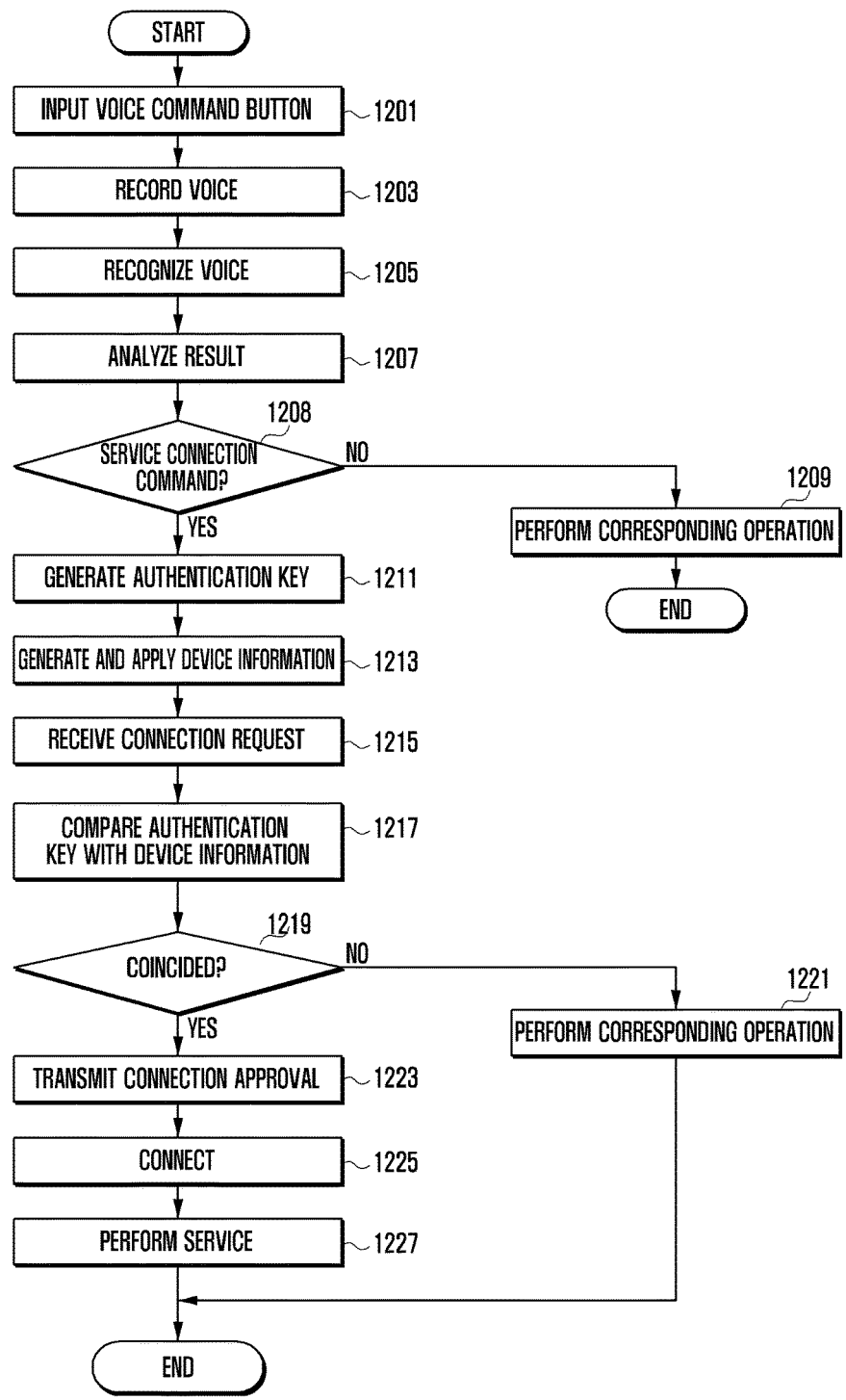

FIG. 12 is a flowchart illustrating a process of processing a service connection based on a user voice in a user device according to an embodiment of the present invention.

FIG. 12 shows another operation example that supports a direct connection between user devices without the server 300. In the present example, the user devices for performing a service connection include a first device and a second device, where the first device requests device connection to the second device according to a predetermined communication method, and the second device receives a device connection request from the first device. FIG. 12 shows an operation of processing a service connection based on a user voice in the second device.

Referring to FIG. 12, if the input of the voice command button 150 is received, in step 1201, the controller 270 records a user voice input through the microphone 243, in step 1203. At this time, the controller 270 records time information (i.e., a timestamp) when detecting an input of the voice command button 150. Further, when detecting an input of the voice command button 150, the controller 270 may control a display screen for a turn-on control or a voice input guide.

When sensing a cancellation of an input of a voice command button 150, the controller 270 performs recognition on the recorded user voice in step 1205, and analyzes the result of the voice recognition, in step 1207. Further, the controller 270 determines whether the user voice corresponds to a command for service connection through the recorded user voice recognition, in step 1208. More specifically, the controller 270 determines whether a start command (e.g., "connect device") for establishing a service connection between devices is detected through voice recognition.

If a start command for service connection is not detected ("NO" in step 1208), the controller 270 controls performance of a corresponding operation, in step 1209. For example, the controller 270 may perform a search of internal data (or contents, etc) for the input user's voice command or may perform a market search or a general Internet search.

If a start command for service connection is detected ("YES" in step 1208), an authentication key is generated, in step 1211. For example, if a device connection is determined according to the start command for service connection, the voice waveform is extracted from recording data of the user voice that is input and recorded through the microphone 243, and time information a timestamp) to which the voice command button 150 has been input is checked. Further, the controller 270 may generate the authentication key value using the voice waveform and time information. In the present example according to an embodiment of the present invention, the authentication key value is generated as a unique string by utilizing the feature of the recorded voice waveform information and time information as considered above.

When the authentication key is generated, if the authentication is connected between devices, the controller 270 generates the authentication key as device information used in identifying the device (e.g., a device identifier) and the authentication key is applied, in step 1213. At this time, when generating the authentication key, the controller checks a communication scheme that is set for establishing service connection and controls activation of the communication mode (i.e., a function) for supporting the checked communication scheme, in step 1211. Further, the controller 270 may change the device identifier to be used in the communication mode to device information based on the authentication key.

The controller 270 receives a connection request for service connection from another external device in a state where device information based on the authentication key has been set, in step 1215. At this time, after setting device information based on the authentication key, the controller 270 performs steps S1117 to S1121 as described with reference to FIG. 11. However, in the example according to FIG. 12, a connection request is received from another external device before transmitting a connection request to another external device, and in this case, the controller 270 may omit the connection request procedure.

When a connection request is received from another external device, the controller 270 compares the generated authentication key with device information of another device having requested connection in step 1217 and determines whether the authentication key coincides with or matches device information, in step 1219. In particular, the controller 270 compares the authentication key with the string of the user voice waveform portion from the device information so as to determine whether the authentication key coincides with or matches the string. More specifically, there may be a difference in the timestamp according to time when the voice command button 150 is input in each device, and thus the time information portion may not coincide, and accordingly, the device determines whether the time waveform portion coincides.

If the authentication key and device information do not coincide with each other ("NO" in step 1219), a corresponding operation is performed, in step 1221. For example, the controller 270 may disregard a connection request from another device and may wait for the connection request of the authenticated device for a predetermined time. Further, the controller 270 may request a service connection by performing steps S1117 to S1127 as described herein with reference to FIG. 11.

If the authentication key coincides with the device information ("YES" in step 1219), the controller 270 transmits a connection approval to another device that has transmitted a connection request, in step 1223. For example, the controller 270 may determine that another device that has transmitted a connection request is a device to be connected. Further, the controller 270 may transmit a connection approval to the device to be connected in response to the connection request of the device to be connected.

After transmitting the connection approval, the controller 270 performs a device connection with the device to be connected in the communication scheme, in step 1225.

When connected with the device to be connected, the controller 270 performs a service, in step 1227. For example, after connecting with the device to be connected, the controller 270 transmits data according to the user's request to the device to be connected, or receives data transmitted from the device to be connected. Further, as described above, when a service command is detected through voice recognition, a service according to the service command may be automatically performed. At this time, as described above, the controller 270 determines whether to operate in a master mode or slave mode with reference to the authentication key and the device information of the device to be connected, era and automatically performs the service in the determined operation mode.

Further, as described above, according to an embodiment of the present invention, a start command for establishing a service connection such as "connect device" is provided. This command is used by the device to distinguish whether the voice input in the voice recognition mode is to be used for a device connection, or to be used for a general voice input for a search of internal device data/contents. Further, the embodiments of the present invention may combine and provide a service command for the service to be executed in the start command that for establishing a service connection. More specifically, a start command for a device connection, such as "connect device transmit file" and a service command ("transmit file") for service performance between connected devices may be combined so as to be input (i.e., spoken). The service command may be input after or before the start command (e.g., "transmit file connect device").

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a Compact Disc (CD), Digital Versatile Disc (DVD), magnetic disk, magnetic tape, etc.

For example, the foregoing embodiments of the present invention may be implemented in an executable program command form by various computer means and be recorded in a computer readable recording medium. The computer readable recording medium may include a program command, a data file, and a data structure individually or a combination thereof. The program command recorded in a recording medium may be specially designed or configured for embodiments of the present invention or be known to a person having ordinary skill in a computer software field to be used. The computer readable recording medium may include Magnetic Media such as hard disk, floppy disk, or magnetic tape, Optical Media such as Compact Disc Read Only Memory (CD-ROM) or DVD, Magneto-Optical Media such as a floptical disk, and a hardware device such as ROM, RAM, flash memory storing and executing program commands. Further, the program command may include a machine language code created by a complier and a high-level language code executable by a computer using an interpreter. The foregoing hardware device may be configured to operate as at least one software module to perform an operation of an embodiment of the present invention, and vice versa.

It will be appreciated that the storage devices and storage media are embodiments of machine-readable storage that are suitable for storing a program or programs comprising instructions that, when executed, implement embodiments of the present invention. Accordingly, embodiments of the present invention provide a program including code for implementing apparatus or a method according to embodiments of the present invention, and further provide a machine-readable storage storing such a program. Still further, such programs may be conveyed electronically via any medium such as a communication signal carried over a wired or wireless connection and embodiments of the present invention suitably encompass the same.

As described above, according to a method and apparatus for connecting a service between user devices using a voice according to embodiments of the present invention, a user-desired service is easily and quickly executed by simplifying a procedure for a connection between at least two devices and a service connection according thereto. According to embodiments of the present invention, user may automatically establish connections amongst user devices easily and quickly by speaking inputting) a voice command requesting a device connection in a state where respective voice command buttons of user devices are pushed. Further, user may automatically execute a service by a connection between user devices easily and quickly by speaking a voice command requesting a device connection and a service intended to be actually executed in a state where respective voice command buttons of user devices are pushed.

According to embodiments of the present invention, a master mode and a slave mode between respective user devices are automatically determined according to a time difference where a user voice was inputted to each user device, and when respective user devices are mutually connected, the service according to the user voice (e.g., data transmission, performance of operation according to the mode) may be automatically performed. Thus, a user may automatically initiate execution of the service by simply connecting user devices by merely inputting the voice command according to the service and connecting devices using the voice command button of respective user devices.

Therefore, according to embodiments of the present invention, by implementing an optimal environment for connection between user devices and supporting execution of a service, user's convenience may be improved, and usability, convenience and competitiveness of the user device may be improved. The present invention may be conveniently implemented in ball forms of user devices and other various devices corresponding to such user devices.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims and their equivalents.

What is claimed is:

1. An electronic device comprising:
   a memory configured to store at least one instruction; and
   a processor configured to execute the at least one instruction to control the device to:
   receive a voice input,
   transmit first information to a server based on the received voice input, wherein the first information includes time information on which the voice input was received and recording data according to the voice input, receive, from the server, second information corresponding to the first information, wherein the second information includes information of an operation mode and information of a service,
establish a connection with an external device according to the information of the service and the information of the operation mode, and
perform the service with the external device.

2. The electronic device of claim 1, wherein the first information further includes at least one of service information and device information of the external device.

3. The electronic device of claim 1, wherein the operation mode includes a master mode and a slave mode.

4. The electronic device of claim 1, wherein the first information comprises an authentication key having a unique string generated using a voice waveform of the received voice input.

5. A method comprising:
receiving a voice input;
transmitting first information to a server based on the received voice input, wherein the first information includes time information on which the voice input was received and recording data according to the voice input;
receiving, from the server, second information corresponding to the first information, wherein the second information includes information of an operation mode and information of a service;
establishing a connection with an external device according to the information of the service and the information of the operation mode; and
performing the service with the external device.

6. The method of claim 5, wherein the first information further includes at least one of service information and device information of the external device.

7. The method of claim 5, wherein the operation mode includes a master mode and a slave mode.

8. The method of claim 5, wherein the first information comprises an authentication key having a unique string generated using a voice waveform of the received voice input.

* * * * *